(12) United States Patent
Shiozawa

(10) Patent No.: US 7,950,991 B2
(45) Date of Patent: May 31, 2011

(54) GAME PERFORMING METHOD, STORAGE MEDIUM, GAME APPARATUS, DATA SIGNAL AND PROGRAM

(75) Inventor: Atsushi Shiozawa, Yamato (JP)

(73) Assignee: Namco Bandai Games Inc., Tokyo (JP)

( * ) Notice: Subject to any disclaimer, the term of this patent is extended or adjusted under 35 U.S.C. 154(b) by 1353 days.

(21) Appl. No.: 10/792,899

(22) Filed: Mar. 5, 2004

(65) Prior Publication Data

US 2004/0242294 A1  Dec. 2, 2004

(30) Foreign Application Priority Data

Mar. 12, 2003  (JP) ................................. 2003-067374

(51) Int. Cl.
A63F 9/24  (2006.01)
(52) U.S. Cl. ........................................................ 463/9
(58) Field of Classification Search .................. 463/3, 9
See application file for complete search history.

(56) References Cited

U.S. PATENT DOCUMENTS

| 5,846,132 | A * | 12/1998 | Junkin | 463/42 |
| 6,371,855 | B1 * | 4/2002 | Gavriloff | 463/42 |
| 2002/0155893 | A1 * | 10/2002 | Swanberg et al. | 463/43 |

FOREIGN PATENT DOCUMENTS

| JP | A 2000-167244 | 6/2000 |
| JP | A 2001-276433 | 10/2001 |
| JP | A 2002-263367 | 9/2002 |

OTHER PUBLICATIONS

"Let's Make a Pro Baseball Team! A Perfect Guide, First Edition", Nov. 6, 2000, p. 58, pp. 86-88 and pp. 151-153.
"Konami Official Guide, Perfect Series, Live Powerful Pro Baseball 8, Definitive Edition, Perfect Guide, Fist Edition" Dec. 27, 2001, pp. 64-67.
"Dugout '99: A Walkthrough to Win the Pennant First Edition", Oct. 28, 1999, p. 14.

* cited by examiner

Primary Examiner — Corbett B Coburn
(74) Attorney, Agent, or Firm — Oliff & Berridge, PLC

(57) ABSTRACT

A game performing method for executing a given sports game which is proceeded by performing match-ups by a plurality of teams arranged for every game owning a plurality of player characters a plurality of times during a virtual competition period, involves varying a value of a team parameter provided for each of the teams according to how a game is proceeding; determining a change-intended team, of which configuration of owned player characters is to be changed by addition and/or release of player characters, among the plurality of teams; judging approval or disapproval of a change of a configuration of owned player characters of the change-intended team based on the current value of the team parameter of the change-intended team; and changing the configuration of the owned player characters of the change-intended team, when it is judged that the change is approved.

7 Claims, 23 Drawing Sheets

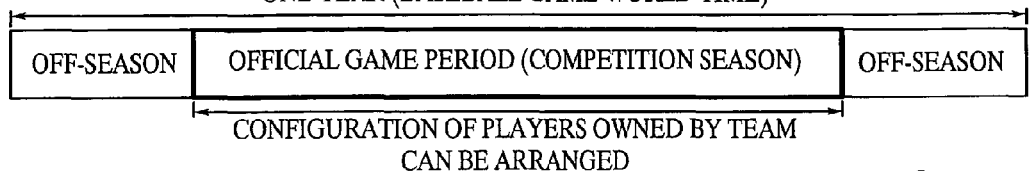
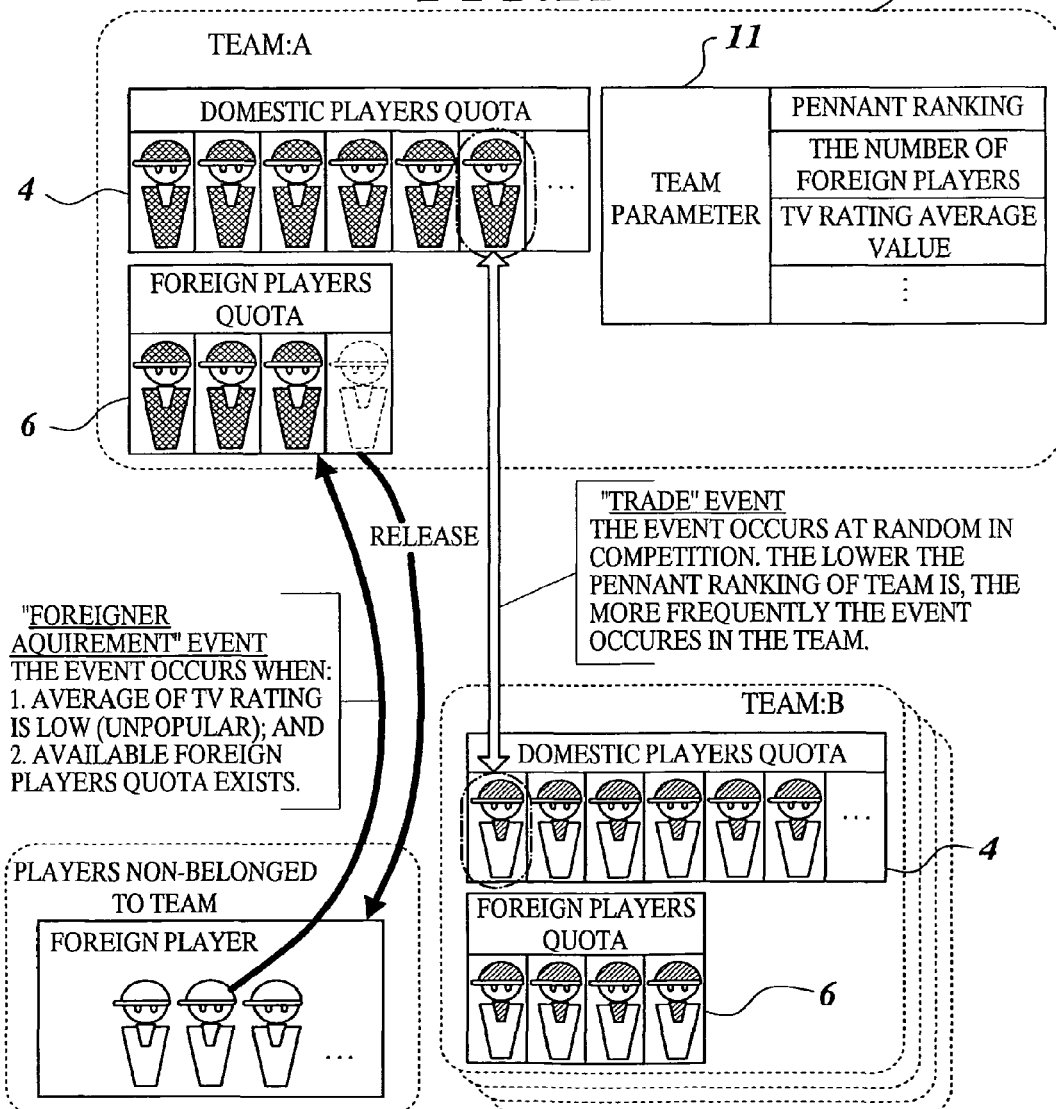

FIG.4

| | SUN | MON | TUE | WED | THU | FRI | SAT |
|---|---|---|---|---|---|---|---|
| APR 2 | | | 1 B | 2 B | 3 | 4 C | 5 C |
| | 6 C | 7 | 8 Y | 9 Y | 10 Y | 11 H | 12 H |
| | 13 H | 14 | 15 C | 16 C | 17 | 18 D | 19 D |
| | 20 D | 21 | 22 Y | 23 Y | 24 Y | 25 B | 26 B |
| | 27 B | 28 | 29 H | 30 H | | | |

SEASON

◁ L1  MAR  APR  MAY  JUN  R2 ▷

TV RATING 0.0%

A - D       B - Y        C - H
A DOME    B STADIUM   C STADIUM

FIG.5A

TV RATING = "SUM OF BASIC TV RATING ADDITIONAL VALUES" × "BASEBALL GAME CONTENTS CORRECTION VALUE 1" × "BASEBALL GAME CONTENTS CORRECTION VALUE 2" × ···

FIG.5B

| BASIC TV RATING ADDITIONAL VALUE | | BASEBALL GAME CONTENTS CORRECTION VALUE | |
|---|---|---|---|
| 1. WIN OR LOSE | | 1. THE NUMBER OF INNINGS OF 1 POINT GAP | |
| WIN | 5 | 8 INNINGS AND ABOVE | 1.1 |
| LOSE | 0 | 7 INNINGS | 2.0 |
| DRAW | 4 | 6 INNINGS | 1.00 |
| 2. YOUR TEAM RANKING | | 5 INNINGS | 1.02 |
| LEAD | 10 | 2. THE NUMBER OF UPSET IN BASEBALL GAME | |
| 2ND | 6 | | |
| 3RD | 5 | ONCE | 1.0 |
| 4TH | 4 | TWICE | 1.1 |
| 5TH | 3 | 3 TIMES | 1.3 |
| 6TH | 2 | 4 TIMES AND ABOVE | 1.7 |
| 3. OPPOSING TEAM RANKING | | 3. FINISHING HOMER | |
| LEAD | 2 | FINISHING HOMER | 1.03 |
| 2ND | 1.5 | FINISHING 2-RUN | 1.07 |
| 3RD | 1 | FINISHING 3-RUN | 1.3 |
| 4TH | 0.5 | FINISHING GRAND SLAM | 1.8 |
| 5TH | 0.2 | | |
| 6TH | 0.1 | | |
| 4. DAY OF THE WEEK | | 4. THE NUMBER OF ENTRIES OF PLAYER WITH NAME VALUE OF "80" AND ABOVE | |
| MON | 0 | 0 | 1.03 |
| TUE | 0 | 1~2 | 0.95 |
| WED | 0.2 | 3~5 | 1.11 |
| THU | 0.7 | 6 AND ABOVE | 1.3 |
| FRI | 1.5 | ⋮ | |
| SAT | 1.3 | | |
| SUN | 2.0 | | |
| ⋮ | | | |

FIG.8

BASEBALL GAME SETTING INFORMATION

| OFFICIAL GAME PERIOD | APR 1~NOV 20 |
|---|---|

| DATE (736a) | DAY (736b) | ON-AIR DATE FLAG (736c) | MATCH-UP COMBINATION (736d) | MATCH-UP RESULT INFORMATION (736e) |
|---|---|---|---|---|
| ⋮ | ⋮ | ⋮ | ⋮ | ⋮ |
| 4/19 | SAT | 1 (ON-AIR DATE) | TEAM A × TEAM D | |
| | | | TEAM B × TEAM Y | |
| | | | TEAM C × TEAM H | |
| 4/20 | SUN | 0 (NO AIR) | TEAM A × TEAM D | |
| | | | TEAM B × TEAM Y | |
| | | | TEAM C × TEAM H | |

NEGOTIATION CONTENTS INFORMATION

| | | | |
|---|---|---|---|
| 1. | CHANGE-INTENDED TEAM IDENTIFICATION INFORMATION | A | |
| | CHANGE-INTENDED PLAYER IDENTIFICATION INFORMATION | F050 | |
| | SUCCESS OR FAILURE FLAG | 1 | |
| | NEGOTIATION STARTING DATE | APR 2 | |
| 2. | CHANGE-INTENDED TEAM IDENTIFICATION INFORMATION | B | D |
| | CHANGE-INTENDED PLAYER IDENTIFICATION INFORMATION | I061 | I112 |
| | SUCCESS OR FAILURE FLAG | 1 | |
| | NEGOTIATION STARTING DATE | APR 10 | |

- 744a: CHANGE-INTENDED TEAM IDENTIFICATION INFORMATION
- 744b: CHANGE-INTENDED PLAYER IDENTIFICATION INFORMATION
- 744c: SUCCESS OR FAILURE FLAG
- 744d: NEGOTIATION STARTING DATE

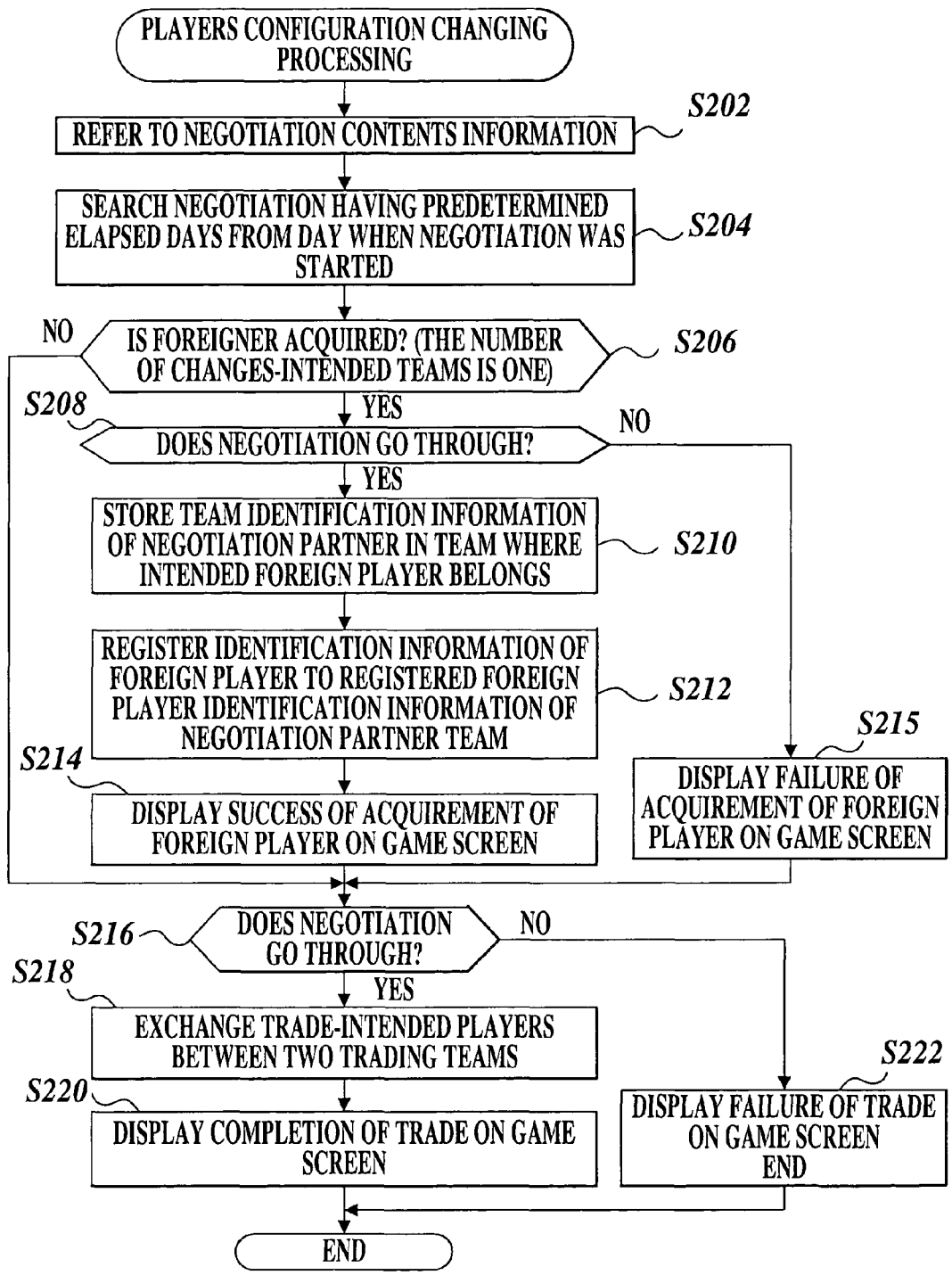

GAME PERFORMING METHOD, STORAGE MEDIUM, GAME APPARATUS, DATA SIGNAL AND PROGRAM

BACKGROUND

This invention relates to game performing method for executing a given sports game.

Among video games implemented by a device such as a computer, there are known sports games in which a plurality of groups possessing a plurality of player characters play a plurality of games as a team during a virtual competition period. The "competition period" herein refers to a period during which the teams play the games to win the championship based on a predetermined schedule. Examples of such games are baseball games, in which a plurality of teams play official games during the virtual pennant race period (official game period; competition period), and soccer games in which a plurality of club teams play league games.

These official game type (pennant race type) sports games feature events to change the configurations of player characters belonging to the groups, as in the real sports world. Examples of such events include the so-called "trade" or "transfer," in which groups exchange a player character with another player character or money, and "foreign player acquirement" or "scout," in which a new player character is added to a group through a contract or persuasion.

In an example of such games, a scouting character (corresponding to a scout man) is operated by the game player to move on a predetermined map. A scouting event occurs to the group when the scouting character comes across another character, and the scout is determined to be a success or failure based on the play results of a mini-game in the event (see, for example, JP-Tokukai-2000-167244A; for all claims).

In another example, the success or failure of a scout for a player character to a group is determined based on the results of a persuasion in the game, in which the game player makes a selection of words for scouting while imagining (reading) the personality of the player character (see, for example, JP-Tokukai-2001-276433A; for all claims).

In still another example, a player character released from a group is brought to an auction, in which bids are made, and each group uses its virtual funds to acquire the player character (see, for example, JP-Tokukai-2002-263367A; for all claims).

The game player manages a group, changes the configuration of player characters of the group through events such as scouts and trades, and increases its strength by changing the team arrangement for official games, thereby advantageously proceeding with the game.

In the real professional sports world, configuration changes of the players such as by a trade are often carried out as an appropriate event during the competition period in response to the relative strengths of groups so that each group can increase its total strength. As a result of the configuration changes of the players such as by a trade, a variety of effects and functions are brought about, such as balancing strengths between groups, raising the morale of players of a group, and realizing a characteristic team arrangement, thereby enhancing the appeal of the official games.

In the conventional virtual sports games, however, events such as a trade occur most exclusively for a group controlled by the game player, and do not occur at all for the other groups that participate in the official games or, even when these events occur, just occur on a simple basis or at random. Therefore, events such as a trade that occur in the game are merely exchanges of player characters irrelevant to the relative strengths of groups, and the potential functions and effects of configuration changes of the player characters could not have been achieved in the game. Particularly in the reality-oriented games, this has been a great disadvantage, obstructing the achievement of augmented reality throughout the game.

SUMMARY

This invention has been made in view of the above-described problems, and has an object of realizing configuration changes of player characters of groups which are made based on the determination on circumstances of the game that change as the game proceeds, thereby enhancing the appeal of the game.

A first aspect relates to a game performing method for executing a given sports game which proceeds by performing match-ups of a plurality of teams arranged for every game by each of a plurality of groups owning a plurality of player characters a plurality of times during a virtual competition period. In the method of the first aspect, a value of a group parameter provided for each of the groups is varied according to a proceeding of a game. A change-intended group, of which configuration of owned player characters is to be changed by addition and/or release thereof, is determined among the plurality of groups. Approval or disapproval of a change of a configuration of the player characters of the change-intended group is judged based on the value of the group parameter of the change-intended group at the moment. The configuration of the player characters of the change-intended group is changed when it is judged that the change is approved.

A second aspect relates to a game device for executing a given sports game which proceeds by performing match-ups of a plurality of teams arranged for every game by each of a plurality of groups owning a plurality of player characters a plurality of times during a virtual competition period. The game device includes a group parameter varying section for varying a value of a group parameter provided for each of the groups according to a proceeding of the game, a change-intended group determining section for determining a change-intended group, of which configuration of owned player characters is to be changed by addition and/or release thereof, among the plurality of groups, a change approval/disapproval judging section for judging approval or disapproval of a change of a configuration of owned player characters of the change-intended group based on the value of the group parameter of the change-intended group at the moment, and a player character configuration changing section for changing the configuration of the player characters of the change-intended group, when it is judged that the change is approved.

The "competition period" herein refers to a period which players play the games to win the championship according to a predetermined schedule.

According to the method of the first aspect and the device of the second aspect, group parameters set for each group can be varied according to the proceeding of the game. Furthermore, based on the group parameter values, the approval or disapproval of a configuration change of the player characters of a group can be determined. That is, the approval or disapproval of a configuration change of the player characters of the group can be issued with more realistic conditions according to the state of the group, with respect to not only the group operated by the game player but also the other groups operated by the computer. Thus, a variety of potential effects and functions that a configuration change of the player characters of a group have originally, the change performed by a trade or the like, can be brought out. Thereby the game can be more realistic and more attractive.

The "game information" herein is equivalent to a program used in a game device or the like for computer processing.

In the method of the first aspect a plurality of games may be selected from un-played games, and a value of a group parameter of a group having played the selected game may be varied based on a match-up result content of the selected game.

According to the above-described method, it is possible to obtain the same effect as those by the method in accordance with the first aspect. Further, several of un-played games can be selected as special games, and the group parameter values of the group having participated in the game can be varied based on the game results of such special games. That is, the several games significantly affect the group parameter values of the group. Thus, in order to proceed with the game more advantageously, it is required to arrange the team with more emphasis on the special games selected by the game selecting section for good game results, and, as a result, well-planned team arrangement (so-called "player rotation") should be taken into consideration, thereby increasing the depth and reality of the game.

In the method of the first aspect, a game plan during the competition period may be set before the competition period, and a virtual special event game may be set. The special event game may be set as the special event.

According to the above-described method, it is possible to obtain the same effect as those by the method in accordance with the first aspect. Further, the game plan setting section can set virtual special event games. Examples of special event games may be a game broadcasted on TV, an exhibition game, and a game inspected by the owner.

In the real sports world, special event games are more important games than usual games because these games are effective to show the group's potential to a wider public. Thus, virtual special event games can be set in the game, and the group parameter values are changed according to the game results of such special event games, thereby giving more reality to the world of the game.

For setting the special event game, in the method of the first aspect, a virtual point of the set special event games may be calculated based on a match-up result content of the set special event game, and a value of a group parameter of a group having played the set special event game is varied based on the calculated virtual point.

In the above-described method, it is possible to obtain the same effect as those by the method in accordance with the first aspect. Further, it is possible to calculate a virtual point based on the results and contents of a game. Examples of the virtual point may be a virtual TV rating if the special event game is a game broadcasted on TV, or a bonus if a game is inspected by the owner.

Since the virtual point may have a tendency to become larger in the case of the so-called "good game," in which the game contents are impressive, for example, the virtual point can be an index suitable for showing the group's potential. Thus, the calculation of virtual points can increase the importance of virtual special event games, and variations in the group parameter values based on the TV ratings can add depth and reality to the world of the game.

In the method of the first aspect each of the player characters may be provided with a popularity parameter showing the popularity thereof, beforehand, and at least the value of the popularity parameter of a player character having participated in the set special event game may be used as the match-up result content of the set special event game. A release-intended player character may be selected from the owned player characters of the change-intended group, based on at least the value of the popularity parameter. The approval or disapproval of release of the selected release-intended player character may be judged based on the value of the group parameter of the change-intended group at the moment. The configuration of owned player characters of the change-intended group may be changed by releasing the selected release-intended player character, when it is judged that the release is approvable.

According to the above-described method, it is possible to obtain the same effect as those by the method in accordance with the first aspect. Further, the appearance of a popular player character (player with a high popularity parameter value) contributes to the virtual point. If the virtual point of a game in which a player character with a high popularity parameter value shows in the lineup is larger than that of a game in which the player character did not show, for example, that can reflect the tendency in the real world also in the game.

In the configuration change of player characters of a group, since the player character to be released may be selected based on the popularity parameter value, a player character with a low popularity parameter value can be selectively released for a possible acquirement of a player character with a higher popularity parameter value that can contribute to the TV audience rating, and to the group parameter values of the group. Thus, it is possible to increase the total strength of a group by an event such as a trade.

In the method of the first aspect, each of the player characters may be provided with a popularity parameter showing the popularity thereof, beforehand, and at least the value of the popularity parameter of a player character having participated in the set special event game may be used as the match-up result content of the set special event game. An addition-intended player character may be selected based on at least the value of the popularity parameter. The approval or disapproval of addition of the selected addition-intended player character may be judged based on the value of the group parameter of the change-intended group at the moment. The configuration of owned player characters of the change-intended group may be changed by adding the selected addition-intended player character, when it is judged that the addition is approvable.

According to the above-described method, it is possible to obtain the same effect as those by the method in accordance with the first aspect. Further, the player character to be added to a group can be selected based on the popularity parameter value in the configuration change of player characters of the group.

If the virtual point of a game in which a player character with a high popularity parameter value shows in the lineup is larger than that of a game in which the player character did not show, for example, the addition of a player character with a high popularity parameter value to a group and the participation of the player character in a special event game can increase the virtual point and group parameter values of the group. Thus, it is possible to increase the total strength of a group by an event such as a trade.

In the method of the first aspect, the group parameter includes at least an average value of the virtual point of games played by the group. The average value of the virtual point of each of the group may be calculated and updated each time the virtual point is calculated. A change-intended group may be determined based on at least the average value of the virtual point of each of the groups.

According to the above-described method, it is possible to obtain the same effect as those by the method in accordance with the first aspect. Further, the average of the virtual points of games played by a group can be managed as a part of the group parameters. Since the virtual points can be an index suitable for showing the group's potential and popularity, the average value of the virtual points indicates the group's averaged potential and popularity. The selection of a change-intended group based on the virtual point average value can be arranged so that a group with a low potential or popularity is selected with more priority to change its configuration of the player characters, for example, thereby reinforcing the strength of or recovering the popularity of the group. That is, a trade in the game can have the same object and effect as those of a trade in the real world, thereby giving more depth and reality to the game.

In the method of the first aspect, the determining the change-intended group includes determining a change-intended group based on the value of the group parameter of each of the groups.

According to the above-described method, it is possible to obtain the same effect as those by the method in accordance with the first aspect. Further, it is possible to determine a group subjected to a configuration change of its player characters according to the state of the group. Thus, a configuration change of player characters of a group, such as a trade, can be carried out in the same state as in the real world.

In the method of the first aspect, each of the player characters is provided with an attribute, beforehand. The change-intended group may be determined based on the number of owned player characters that are provided with a predetermined particular attribute.

According to the above-described method, it is possible to obtain the same effect as those by the method in accordance with the first aspect. Further, a configuration change of player characters of a group can be made based on the number of player characters of the group that have a particular attribute. Such an attribute may be set as appropriate, and may include nationality, sex, age, popularity, fielding position, or the like of a player character. If a limitation is imposed on the number of player characters of a group that have a particular attribute, the disparity in strength between groups can be restricted, thereby balancing the strengths of groups. Alternatively, the number of limitations or the attribute of player characters subjected to a limitation can be varied for each group, thereby intentionally adding a characteristic to each group or changing the difficulty level of the game.

In the method of the first aspect, the group parameter includes at least a virtual fund owned by a group. The player character belonging to none of the groups and provided with an acquirement money amount may be generated, and the approval or the disapproval of the change of a configuration of the player characters may be judged based on the acquirement money amount of the non-belonged player character and the amount of the virtual fund of the change-intended group at the moment, when the generated non-belonged player character is added as a change of the owned player characters.

According to the above-described method, it is possible to obtain the same effect as those by the method in accordance with the first aspect. Further, a non-belonged player character that belongs to none of the groups can be generated beside predetermined player characters, which allows the addition of a new player character to provide variation in a configuration change of the player characters. Setting parameters of a generated player character at random, for example, can create a player character with an unpredictable characteristic to participate in the game.

A group can change its configuration of the player characters by the addition of a non-belonged player character to the group with the use of a virtual fund provided for each group, as in the real world, in which a group makes a contract with a new player to call in from outside, thereby adding more reality to the game. The virtual fund is the amount of currency in the game world possessed by a group, and its unit may be the amount of money, number of points, number of items, or an imaginary unit.

In the method of the first aspect two groups may be determined among the plurality of groups as change-intended group. The approval or disapproval of a trade may be judged between part of the player characters of one group and part of the player characters of the other group, among the two determined change-intended group. The trade of player characters may be executed to change the configuration of the player characters of each of the two determined change-intended groups, when it is judged that the addition is approvable.

According to the above-described method, it is possible to obtain the same effect as those by the method in accordance with the first aspect. Further, two change-intended groups can be determined automatically, and the trade of the player characters can be performed between the groups. Hence, the displacement of the player characters between groups can be performed even during the competition period.

In the method of the first aspect, a frequency of the determining of the change-intended group may be varied according to the proceeding of the game.

According to the above-described method, it is possible to obtain the same effect as those by the method in accordance with the first aspect. Further, trades can be produced with different frequencies as the game proceeds. By setting the frequency in the latter half of the season higher than that in the first half, for example, it is possible to reproduce the state as seen in the real world also in the game, in which trades are less often made at the start of the season compared to near the end of it, when groups make more trades for the purpose of reinforcing their strengths after making strategy analyses.

In the method of the first aspect, a ranking of each of the plurality of groups may be determined according to each of game results as necessary during the competition period. The change-intended group may be determined based on the determined ranking.

According to the above-described method, it is possible to obtain the same effect as those by the method in accordance with the first aspect. Further, a configuration change of player characters of a group can be made according to the group's ranking in the official games. If a group with a lower ranking is more likely to be determined as a change-intended group than a group with a higher ranking, that can reproduce also in the game the state in which a weak group changes its configuration of the player characters for the reinforcement of its strength, thereby enhancing the reality of the game.

In the method of the first aspect, the change-intended group may be changed before or after the competition period.

According to the above-described method, it is possible to obtain the same effect as those by the method in accordance with the first aspect. Further, it is possible in the game world to carry out a transfer of a player before or after the season, during which official games are played, as in the real world.

According to a third aspect, a storage medium has information recorded thereon, when the information is loaded onto an operating device, the information making the operating device execute the method as described above.

Hereupon, various types of IC memories, a CD-ROM, DVD, MO, memory card, memory cassette, and hard disk correspond to this storage medium. It is possible to obtain the same effect as those by the method in accordance with the first aspect of the present invention, by making the operating device load the information stored in such storage medium to process the operation.

According to a fourth aspect, a data signal embodied in a carrier wave, comprises information used for executing the method as described above.

According to a fifth aspect, a program makes the operating device execute the method as described above, when the program is loaded onto an operating device.

BRIEF DESCRIPTION OF THE DRAWINGS

The present invention will become more fully understood from the detailed description given hereinafter and the accompanying drawing given by way of illustration only. However, these are not intended as a definition of the limits of the present invention.

FIG. 2A and FIG. 2B are diagrams for describing the conceptual configuration of a team according to the first embodiment;

FIG. 4 is a diagram showing an example of the game schedule and TV broadcasted dates during the official game period, and corresponding to a screen displaying the game schedule to which the game player can refer to at any time during the game;

FIG. 5A is a diagram showing an example of the calculation formula of a TV rating, and FIG. 5B is a diagram showing an example of TV rating setting information to which the TV rating calculating section refers in the calculation;

FIG. 8 is a diagram showing an example of the baseball game setting information according to the first embodiment;

FIG. 9 is a diagram showing an example of the negotiation contents information according to the first embodiment;

FIG. 14 is a flowchart for describing the player configuration changing process according to the first embodiment;

DETAILED DESCRIPTION OF EMBODIMENTS

Hereinafter, embodiments of the present invention will be explained with reference to the drawings. However, the scope of the invention is not limited to the illustrated figures.

First Embodiment

Description will be made in detail of a first embodiment according to the present invention with reference to FIG. 1 to FIG. 17. In this embodiment, a baseball game is exemplified in which a club possessing a plurality of players arranges a team which repeatedly plays games over an official game period. The official game period herein refers to a competition period, corresponding to the so-called "pennant race period" or "championship season." That is, the official game period is a virtual period which the players play the games to win the championship during a predetermined schedule.

Note that the present invention is not only applicable to a baseball game, but also to a game such as a soccer, basketball, volleyball, or hockey game, in which a club possessing a plurality of players arranges a team which repeatedly plays games over an official game period.

[Description of Configuration]

Figure 1:
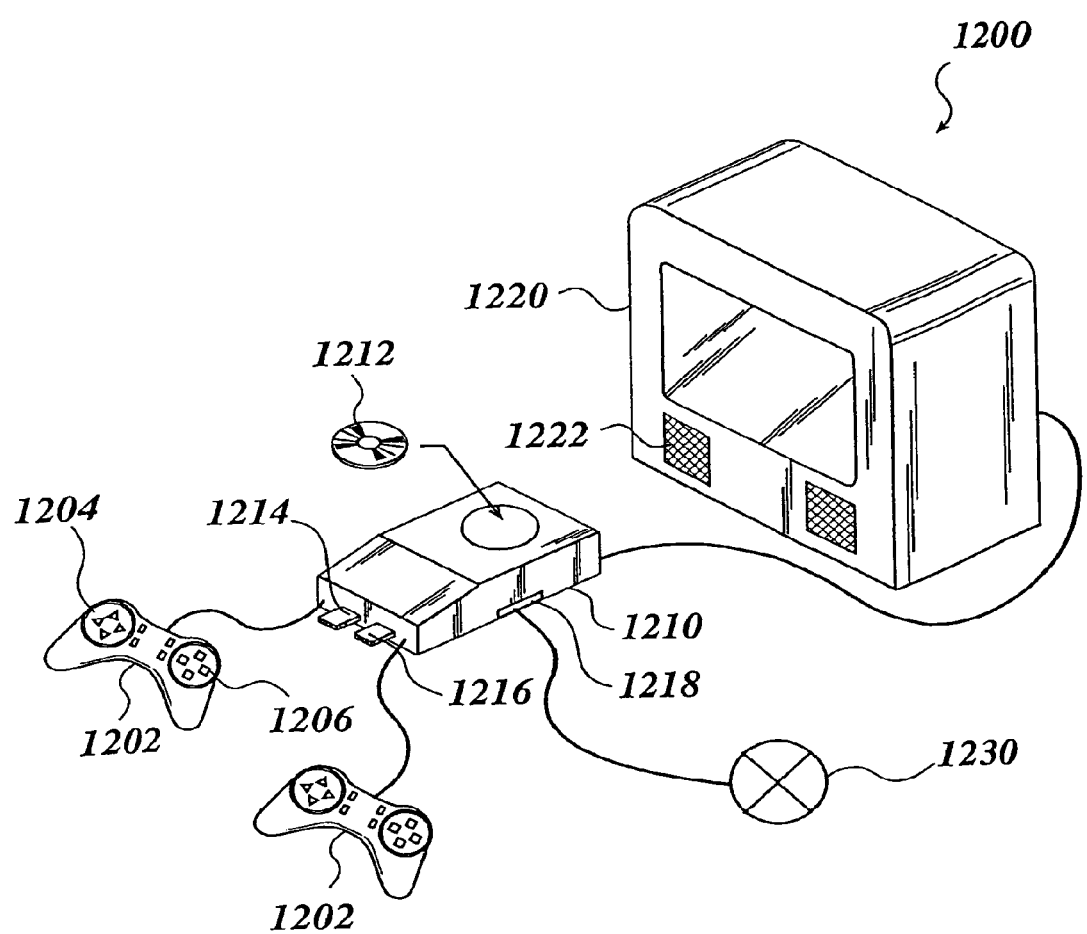
FIG. 1 is a diagram showing an example of a home game unit to which the present invention is applied.

FIG. 1 is a diagram showing an example of a home game unit to which the present invention is applied. As shown in FIG. 1, the home game unit 1200 has game controllers 1202 and a main unit 1210, and is connected to a display 1220 equipped with a speaker 1222.

The game information required to execute the game, such as a game program and initial data, is stored in the information storage medium detachable from the main unit 1210, for example, a CD-ROM 1212, an IC memory 1214, and a memory card 1216. Alternatively, the game information is obtained from an external device through a communication device 1218 which is equipped on the main unit 1210 and connected to a communication line 1230. The communication line 1230 refers to a communication channel which allows data transmission and reception. In other words, the communication line 1230 may be a dedicated line (dedicated cable) for direct connection, a LAN through Ethernet (registered trademark) or the like, and a communication network such as a telephone network, a cable network, or the Internet, whether its communication method is wired or wireless.

The main unit 1210 is equipped with a processing unit such as a CPU, and a reader for the information storage medium such as the IC memory 1214 and CD-ROM 1212. The main unit executes various game processing based on the game information read from the CD-ROM 1212 or the like and operation signals inputted from the game controller 1202, displays game screens on the display 1220, and outputs game sounds from the speaker 1222.

The game player operates a direction key 1204, a button switch 1206, and the like provided on the game controller 1202 while watching the game screens shown on the display 1220 to enjoy playing the baseball game. In this embodiment, the direction key 1204 is operated to select a player character to be the subject of a trade and the condition of the trade, and the push switch 1206 is operated to input the decision or the cancellation, for example.

[Description of Summary of Game]

In the baseball game in this embodiment, six teams play one hundred and thirty (130) games in total against one another over the official game period set within one year in the game world to win the so-called "pennant race." The game player selects any one of the six teams as the game player's team. The game player arranges a team from the player characters of the group (the same meaning as the player character belonging to the group, which may be hereinafter referred to as "possessed player" as appropriate) to play a game against a team played by the computer (or by another game player). During the game, the game player can input a variety of operations of pitching, fielding, base-running, batting, and the like to enjoy the baseball game.

FIG. 2A and FIG. 2B are diagrams for describing the conceptual configuration of a team in this embodiment. As shown in the diagram, the player characters of each team 2 include domestic players 4 and foreign players 6 having different attributes, on which a domestic players quota and a foreign players quota are set, respectively, to limit the maximum number of players that can be in the roster. In the diagram, the foreign players quota is 4. The information of each team 2 contains team parameter 11 for the team.

The configuration of the player characters for each team can be changed even during the official game period. The change in the configuration of the player characters is performed in a "trade" event, in which two teams exchange their domestic players, and in a "foreign player acquirement negotiation" event, in which a team pays virtual contract money to acquire a foreign player that does not belong to any of the teams. In the present specification, the removal of a player character from the configuration is referred to as "to release" or "to delete from the registration," and the addition to the configuration is referred to as "to acquire" or "to register" as appropriate.

A "trade" event in this embodiment occurs with random timing during the official game period. A team with a lower ranking in the pennant race is more likely to be selected as one of the two teams that make a trade.

A "foreign player acquirement negotiation" event in this embodiment occurs during the official game period to a team with "team parameters," as parameters set for each team, falling short of a predetermined condition. It also occurs at random during the official game period.

The team parameters are parameters set for each team, and vary depending on the results of games played in the pennant race. The team parameters in this embodiment include, for example, the team's ranking in the pennant race, the virtual TV rating average value corresponding to the team's popularity, and the number of registered foreign players of the team (the number of foreign players). Team parameters are determined to fall short of a predetermined condition when the TV rating average value does not satisfy a predetermined condition, or when the number of registered foreign players is less than its maximum, for example. A trade will serve to enhance recovery of the team's lowered popularity in the former case, or will serve as a reinforcement of the team's strength in the latter case.

That is, in this embodiment, events such as a "trade" and a "foreign player acquirement negotiation," which involve changing the configuration of player characters of a team, occur according to the state of each team (team parameters), which changes as the game proceeds. In this way, a more real pennant race can be materialized as in the actual professional baseball world, in which teams make a trade and acquire a foreign player even during the official game period to increase the team's strength.

[Description of Function Block]

Figure 3:
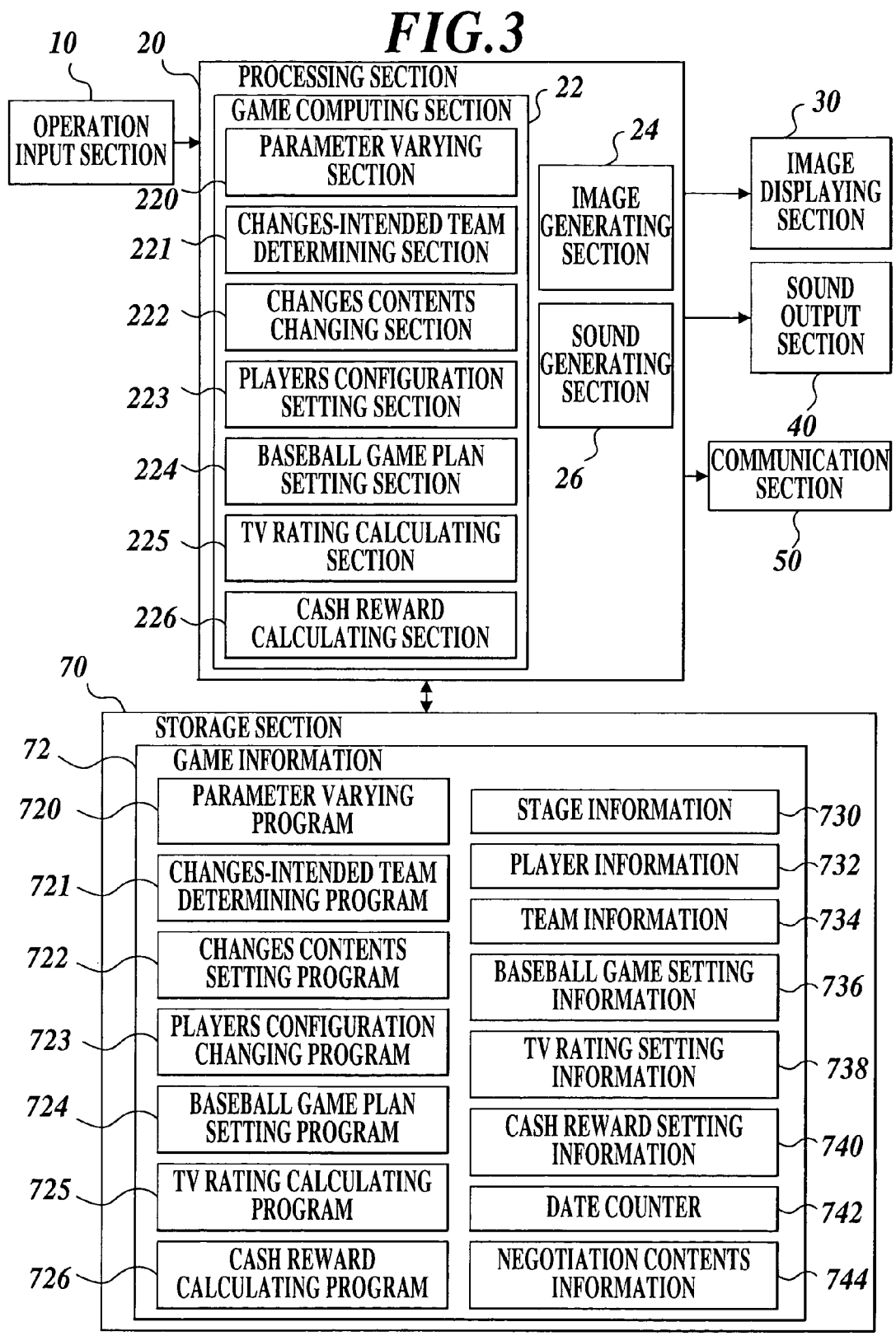
FIG. 3 is a block diagram showing an example of the functional configuration according to the first embodiment.

FIG. 3 is a block diagram showing an example of the functional configuration of this embodiment. As shown in the drawing, the home game unit 1200 is provided with an operation input section 10 for inputting operations from the game player, a processing section 20 for processing operations to control the unit and the game, an image displaying section 30 for outputting game screens to be displayed, a sound output section 40 for outputting game sounds to be sounded, a communication section 50, and a storage section 70 for storing a variety of programs and data.

The operation input section 10 functions by section of a button switch, lever, dial, mouse, keyboard, or other various sensors, is inputted operations by a player, and outputs operation input signals to the processing section 20. In this embodiment, the game controllers 1202 correspond to this operation input section.

The processing section 20 controls the whole of the home game unit 1200 as well as executing various computing processes such as game computing. The functions thereof are implemented by hardware such as a CPU (CISC type and RISC type) or an ASIC (gate array), and the related control programs. The processing unit, such as the CPU, equipped with the main unit 1210 in FIG. 1 corresponds to this processing section.

The processing section 20 includes a game computing section 22 serving for mainly game computing, the image generating section 24 for generating the image signals to display the game screens based on various data obtained from the processes executed by the game computing section 22, and the sound generating section 26 for generating game sounds to be output as sound effects or BGM.

The game computing section 22 executes various game processing based on the signals inputted through the operation input section 10, or the program and data loaded from the storage section 70. As the game processing, for example, arranging objects in a virtual space, controlling motions of objects of player characters based on signals inputted from the operation input section 10, computing paths of pitched and batted balls, crossing detection for objects (hit check), calculating the batting results, calculating the game results (records), arranging view points, determining view directions or the like, are performed.

The game computing section 22 in this embodiment includes: (1) a parameter varying section 220 for varying parameters set for each team and player character according to the progress and play results of the game; (2) a change-intended team determining section 221 for selecting a team which can change its configuration of the player characters as a change-intended team; (3) a changes contents setting section 222 for determining the contents of the configuration change of the team selected as the change-intended team based on its team parameters; (4) a players configuration changing section 223 for carrying out the process of changing the configuration of the player characters; (5) a baseball game plan setting section 224 for setting the schedule of games during the official game period and for setting several of the games as special event games which are held on virtual TV broadcast dates; (6) a TV rating calculating section 225 for calculating a virtual TV audience rating, which is a virtual point determined based on the results of a game held on the TV broadcast date; and (7) a money reward calculating section 226 for calculating a virtual money reward based on the calculated TV rating.

The parameter varying section 220 varies team parameters set for each team and player parameters set for each player character according to the progress and play results of the game. As examples of the team parameters, the ranking in the pennant race (pennant ranking), the number of registered foreign players, the TV rating average value, and the fund of the team may be used.

The TV rating average value is the average value of TV ratings calculated by the TV rating calculating section 225, and is an index of the team's popularity. The fund is the total amount of cash rewards which have already been received by the team. As examples of the player parameters, the playing record and the name value of the player character may be used. The name value is determined according to the playing record of the player character, and is an index of the player character's popularity.

The change-intended team determining section 221 has functions of: (1) determining a team with its team parameters falling short of a predetermined condition as the change-intended team; and (2) automatically selecting two teams which make a trade as the change-intended teams.

More specifically, in the former case, the change-intended team determining section 221 selects as the change-intended team a team with its TV rating average value lower than a predetermined TV rating value or a team with the number of registered foreign players less than its foreign players quota, for example, to allow acquiring a foreign player. In the latter case, the change-intended team determining section 221 divides the official game period into a first half and a latter half, for example, and arranges that events occur with a predetermined probability (5%, for example) in the first half, and that events occur with a higher probability (8%, for example) in the latter half. In the selection of two change-intended teams, a team with a lower ranking in the pennant race is selected with a higher probability, and a team with a higher ranking is selected with a lower probability.

The changes contents setting section 222 decides, for the team selected as the change-intended team by the change-intended team determining section 221, the contents of the configuration change of the player characters, that is, the contents of the "trade" and "foreign player acquirement negotiation," and determines whether the configuration change succeeds or fails (corresponding to the success or failure of the trade or foreign player acquirement negotiation).

More specifically, in the case that only one team is selected as the change-intended team, that is, the change-intended team determining section 221 determines that its team parameters fall short of a predetermined condition, the team carries out an acquirement of a foreign player. That is, if the change-intended team already has the full number of registered foreign players to the maximum of its foreign player registration quota, the player character with the lowest name value of the player parameters is automatically released to make room available in the foreign players quota. If there is room available in the foreign player registration quota, a player character to be acquired is selected among non-belonged foreign players. At this time, if the change-intended team is the game player's team, the game player makes an input to select the foreign player to be acquired.

Then, if the fund of the team is more than the acquired money (corresponding to the contract money) set in advance for each foreign player, it is determined that the negotiation goes through, that is, the acquirement goes through, and, to the contrary, if the fund is less than the acquired money, it is determined that the negotiation does not go through, that is, the acquirement does not go through.

In the case that two teams are selected as the change-intended teams, that is, selected by the change-intended team determining section 221 as teams which make a trade, player characters as trade personnel are selected to carry out the so-called trade process.

More specifically, first, the number of player characters to be traded (one to one, plural to plural, for example) is determined at random. When the number of players to be traded is determined, player characters to be released by the trade (trade personnel) are selected. The determined number of player characters (hereinafter referred to as "first trade-intended players") are first selected from one of the teams, with a higher probability as the player character's name value is lower. The same number of player characters (hereinafter referred to as "second trade-intended players") are then selected from the other team, of which fielding positions are the same as, and of which name values are generally equivalent to those of the first trade-intended players. If the second trade-intended players can be successfully selected, it is determined that the negotiation goes through, that is, the trade goes through. On the contrary, if the second trade-intended characters cannot be selected because, for example, player characters corresponding to the first trade-intended players do not exist, it is determined that the negotiation does not go through, that is, the trade does not go through.

The players configuration changing section 223 changes the configuration of player characters of the team and changes to which team the player characters subjected to the change belong, according to the change contents of the negotiation that is determined to go through by the changes contents setting section 222.

The baseball game plan setting section 224 sets the schedule of games before the official game period starts, and sets several of the games as held on virtual TV broadcast dates. FIG. 4 shows an example of the game schedule and TV broadcast dates during the official game period in this embodiment, corresponding to a screen showing the game schedule to which the game player can refer to any time during the game. As shown in the drawing, the calendar displays a team 1 against which the game player's team plays a game, and a camera mark 5 indicating that the date with the mark is a TV broadcast date. At the lower section of the screen is shown a list 7 of games held on the date selected by a selector 3.

In the drawing, the screen shows that, for example, the game player's team has a game against the team B on April 2, which is not a TV broadcast date. It also shows that the game player's team has a game against the team D on April 19, which is a TV broadcast date. It can also show the results of games that have already been finished, and, if a TV broadcast date is selected by the selector 3, show a TV rating 9. In the drawing, the TV rating 9 is "0.0%" since the game on April 19 has not yet been played.

The TV rating calculating section 225 calculates a virtual TV rating based on the game results of a game held on a virtual TV on-air date set by the baseball game plan setting section 224. FIG. 5A shows an example of the calculation formula, and FIG. 5B shows an example of TV rating setting information 738 to which the TV rating calculating section 225 refers in the calculation.

The TV rating in this embodiment is calculated according to the game results or the game contents of a game held on a TV broadcast date. That is, the TV rating is determined as the total sum of basic TV ranking additional values (738a to 738d), which are shown in FIG. 5B, multiplied by each of baseball game contents correction values (738e to 738h).

The basic TV rating additional values are set in advance as the number of wins and losses of the games, the team's ranking, and the day of the week of the TV broadcast date, for example. The baseball game contents correction values are set in advance as the number of innings of 1 score difference, the number of changes of leads in the game, the type of the game-ending homerun, and the number of entries by player characters with higher name values, for example. As a result, if teams with high rankings play a close, thus dramatic and impressive game with many upsets on a day of the week on which the game draw more viewers, the game produces a high TV rating. The entry of a player character with a high popularity also produces a high TV ranking.

The contents of elements, the additional values and the correction values may be set as appropriate.

The cash reward calculating section 226 calculates a virtual cash reward in response to the value of the TV rating calculated by the TV rating calculating section 225. The total sum of cash rewards that have been already paid to a team is the "fund" as one of the team parameters. The fund of a team is virtual money obtainable in the game, and serves, in this embodiment, as virtual contract money for a foreign player. That is, in order to acquire a foreign player, the team's fund (total sum of cash rewards) needs to have reached the "acquired money," which is set in advance for each foreign player, corresponding to the desired amount of contract money. Relation for calculating a cash reward from a TV rating may be set as appropriate.

The functions of the image generating section 24 are implemented by the processing unit such as the CPU or DSP, the control program and the IC memory for image frames such as a frame buffer. The image generating section 24 executes a geometry conversion process and a shading process based on the results computed by the game computing section 22, and generates the 3D CG images for displaying the game screen. Furthermore, the image generating section 24 also combines images with the 3D CG images. Then, the image generating section 24 outputs the image signals of the generated game images to the image displaying section 30.

The sound generating section 26, which is implemented by a processing unit such as a CPU or DSP and its control program, generates sounds used in the game such as sound effect and BGM, and outputs the sound signals to the sound output section 40.

The image displaying section 30 is designed to display the game screen by refreshing a screen of one frame per 1/60 second, for instance, based on the image signals from the image generating section 24. The image displaying section 30 is implemented by hardware such as a CRT, LCD, ELD, PDP or HMD. The display 1220 in the example of FIG. 1 corresponds to this section.

The sound output section 40 outputs game sounds including sound effects and BGM based on the sound signals generated the sound generating section 26. The speaker 1222 in the example of FIG. 1 corresponds to this section.

The communication section 50 connects with a communication line to transmit and receive data to and from an external device. The communication section 50 is implemented by, for example, a module of, for example, Bluetooth (REGISTERED TRADEMARK) or IrDA, modem, TA, communication cable jack, and control circuit. The communication device 1218 in FIG. 1 corresponds to this section. Information such as protocol used in the communication by the communication section 50 is stored in the storage section 70, for example, to be read as necessary.

The storage section 70 stores a system program (not shown) which implements various functions of permitting the processing section 20 to synthetically control the home game unit 1200, game information 72 including the program and data required for it to execute the game. The functions of the storage section 70 are implemented by an information storage medium such as various types of IC memories, a hard disc, CD-ROM, DVD and MO. The CD-ROM 1212, the IC memory 1214, and the memory card 1216 equipped with the main unit in FIG. 1 correspond to this information storage medium.

Game information 72 includes programs and data to permit the processing section 20 to function as the game computing section 22.

The programs include a parameter varying program 720 for permitting the processing section 20 to function as the parameter varying section 220, a change-intended team determining program 721 for permitting it to function as the change-intended team determining section 221, a changes contents setting program 722 for permitting it to function as the changes contents setting section 222, a players configuration changing program 723 for permitting it to function as the players configuration changing section 223, a baseball game plan setting program 724 for permitting it to function as the baseball game plan setting section 224, a TV rating calculating program 725 for permitting it to function as the TV rating calculating section 225, and a cash reward calculating program 726 for permitting it to function as the cash reward calculating section 226.

The data include stage information 730, player information 732, team information 734, baseball game setting information 736, TV rating setting information 738, cash reward setting information 740, date counter 742, and negotiation contents information 744. Although not shown in the drawing, the data also include a variety of information used during a baseball game in progress, such as the number of the inning, top and bottom of the inning, count of balls and strikes, batting order, and data for replay.

The stage information 730 includes, for example, information on objects (modeling data, texture data, displaying position setting, and sound data such as sound effects, for example), which are used to display in a virtual space, a stage and items used in the baseball game, such as a stadium, a count display, spectators, a ball and a bat.

Figure 6A:
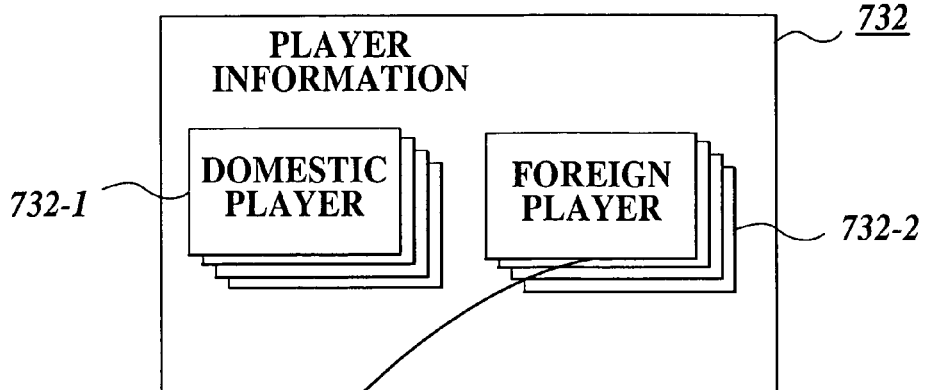
FIG. 6A and FIG. 6B are diagrams showing an example of the player information according to the first embodiment.
Figure 6B:
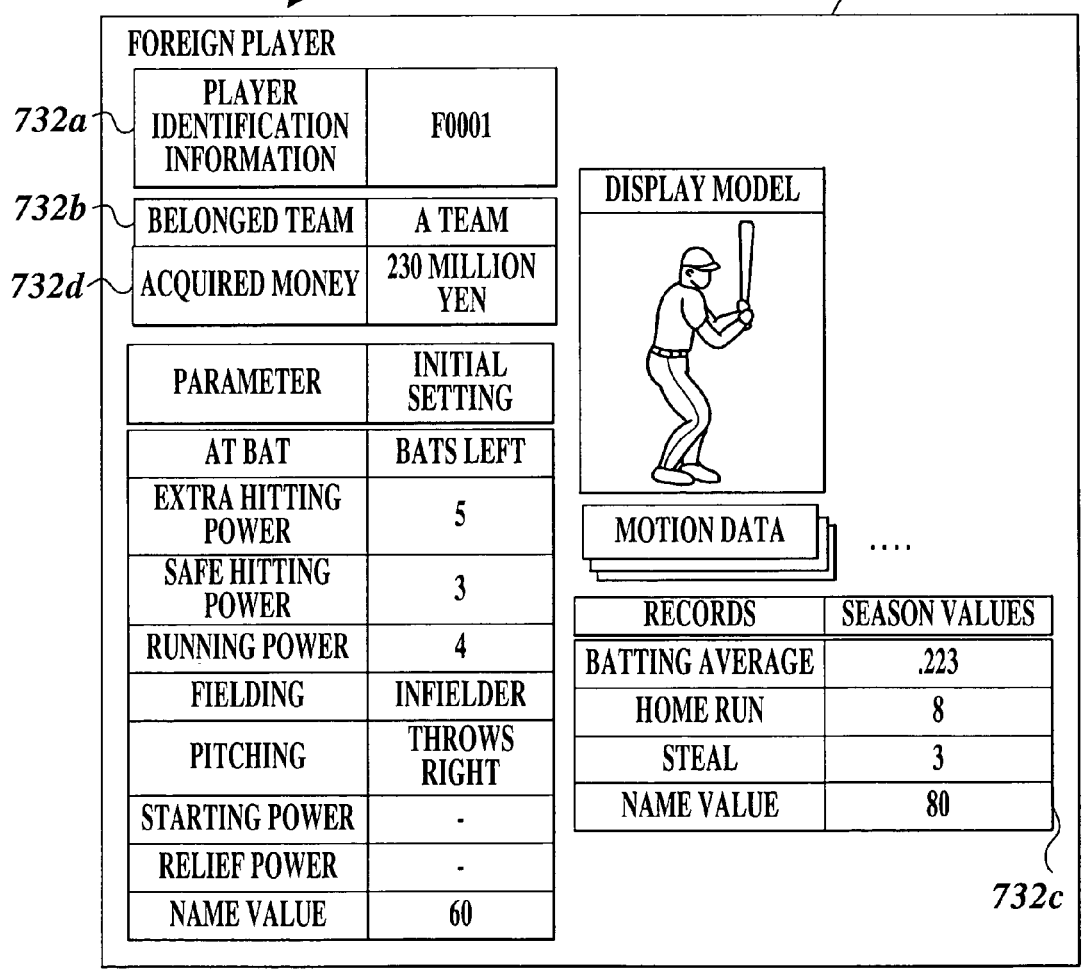

FIG. 6A and FIG. 6B show an example of the player information 732 in this embodiment. As shown in FIG. 6A, the player information 732 includes information on each of the player characters having different attributes, namely domestic players 732-1 and foreign players 732-2, related to and stored for each of them.

As shown in FIG. 6B, examples of the player information 732 on one player character include player identification information 732a (or player's name), belonged team 732b, display model, motion data, initial setting values of parameters ("1" to "5," for example), and season values updated as the game proceeds. In this embodiment, the player information 732 particularly includes name value 732c ("0" to "100," for example), which shows the player character's popularity, and acquired money 732d. Domestic players 732-1 also have similar information related to and stored for each of them.

The team information 734 is provided for each team, and stores team parameters and identification information of player characters of the team.

Figure 7:
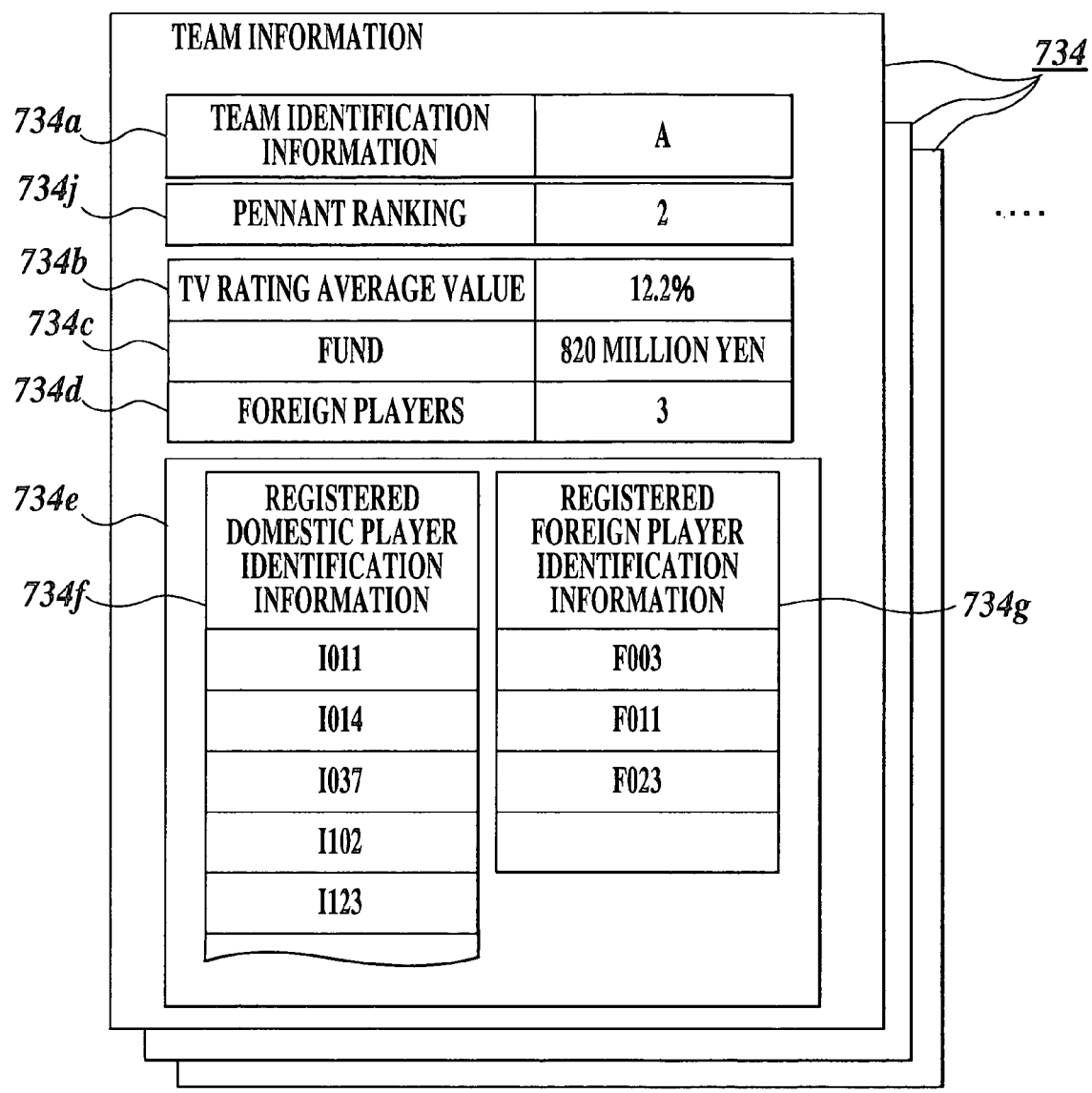
FIG. 7 is a diagram showing an example of the team information according to the first embodiment.

FIG. 7 shows an example of the team information 734 in this embodiment. As shown in the drawing, the team information 734 includes team identification information 734a, team parameters such as TV rating average value 734b, fund 734c and number of foreign players 734d, team player information 734e, and pennant ranking 734j, mutually related and stored therein. The TV rating average value 734b is the average value of past TV ratings set by the TV rating calculating section 225, corresponding to an index of the team's popularity. The team player information 734e includes registered domestic player identification information 734f, which shows the domestic players registered on the team, and registered foreign player identification information 734g, which shows the foreign players registered on the team. When the players configuration changing section 223 changes the configuration of player characters of a team, the character information 734e is updated as appropriate.

FIG. 8 shows an example of the baseball game setting information 736 in this embodiment. The baseball game setting information 736 includes date 736a, day of the week 736b, broadcast date flag 736c, match-up combination 736d, and match-up result information 736e, mutually related and stored therein.

The date 736a, day of the week 736b, and broadcast date flag 736c are set by the baseball game plan setting section 224. The date 736a and day of the week 736b are set corresponding to the virtual calendar during the official game period. The broadcast date flag 736c shows whether or not the date is set as a TV broadcast date by the baseball game plan setting section 224. The match-up combination 736d stores the team identification information of pairs of opposing teams. The match-up result information 736e stores, for example, score, TV rating, and amount of the acquired cash reward. The match-up result information 736e may include data for displaying replay pictures.

The TV rating setting information 738 stores the settings of the basic TV rating additional values and baseball game contents correction values, which are set in advance for calculating a TV rating. The TV rating calculating section 225 calculates a TV rating with reference to the TV rating setting information 738. Preferably a plurality of sets of TV rating setting information 738 are provided, for example, one for the pennant race and another for the championship, in which the winners of respective leagues in the pennant race play games, and the set for the latter is arranged to provide a higher TV rating, thereby enhancing the reality of the game.

The cash reward setting information 740 stores information (table data, coefficients, and correction values, for example), which is set in advance for calculating a cash reward according to the TV rating. The cash reward calculating section 226 calculates a cash reward with reference to the cash reward setting information 740.

FIG. 9 shows an example of the negotiation contents information 744 in this embodiment. The negotiation contents information 744 stores information on the changes contents set by the changes contents setting section 222 for managing a trade or foreign player acquirement negotiation. The negotiation contents information 744 stores, for example, change-intended team identification information 744a, which shows a team subjected to a foreign player acquirement or trade, change-intended player identification information 744b, which shows a player character subjected to the acquirement or trade, success or failure flag 744c, which shows whether the negotiation is a success or failure, and negotiation starting date 744d, on which the virtual negotiation is started. The players configuration changing section 223 carries out a configuration change of the player characters according to the contents of the trade or foreign player acquirement, if a predetermined number of days have elapsed from its negotiation starting date stored in the negotiation contents information 744 and if its success or failure flag is "1," which represents a success.

[Description of Process Flow]

Then, description will be made of a flow of the process of changing the configuration of player characters of a team ("trade" and "foreign player acquirement negotiation") in this embodiment with reference to FIG. 10 to FIG. 14. This process is implemented by the processing section 20, which reads from the game information 72 and executes the parameter varying program 720, the change-intended team determining program 721, the changes contents setting program 722, the players configuration setting program 723, the baseball game plan setting program 724, the TV rating calculating program 725, the cash reward calculating program 726, and, not to mention, the game program.

[1. Entire Flow]

Figure 10:
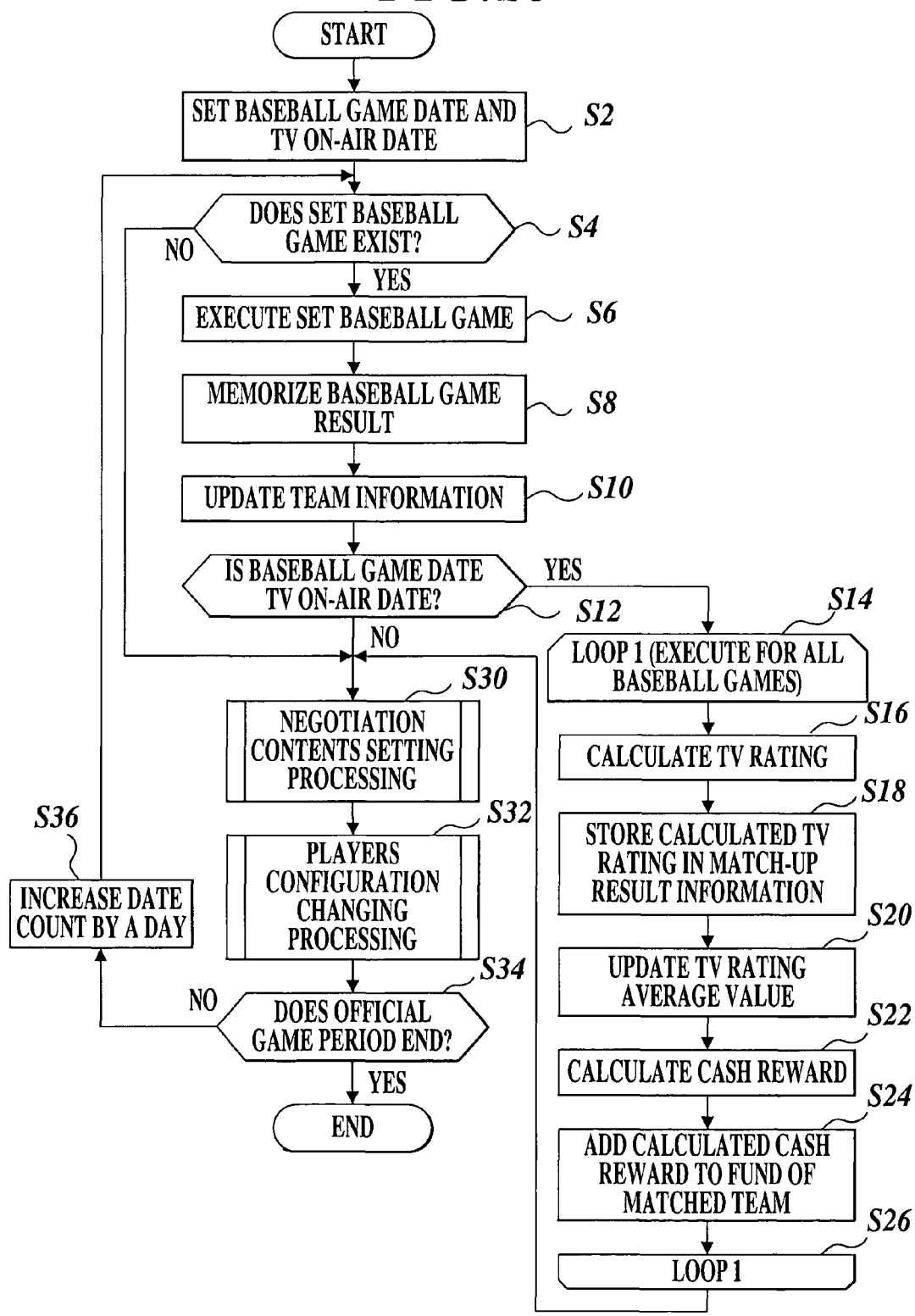
FIG. 10 is a flowchart for describing the entire process of changing the configuration of player characters of a team.

FIG. 10 is a flowchart for describing the entire process of changing the configuration of player characters of the game player's team in this embodiment. The game player's team refers to the team operated by the game player, which has been selected by the game player among the six teams. The teams other than the game player's team are controlled by the computer.

In the drawing, first, the baseball game plan setting section 224 sets the schedule of baseball games during the official game period on the game world calendar, and sets a predetermined number of TV broadcast dates among the set baseball games (step S2). The TV broadcast dates may be selected at random from the baseball games held each month, for example. The set information is stored as the baseball game setting information 736. At this time, the game computing section 22 sets the date counter 742 to January 1 or to the first day of the official game period, for example, as an initial state.

The game computing section 22 refers to the baseball game setting information 736, and, if there exists any baseball game set on the date (step S4; Yes), executes the set baseball game (step S6). That is, if there exists a baseball game for the game player's team, the baseball game is played by the game player's team and a computer team, as in the conventional baseball games. If there exists a baseball game to be played by two computer teams, the game computing section 22 controls (computer control) both the teams to execute the baseball game.

When the baseball game is over, the game computing section 22 stores the baseball game results in the match-up result information 736e of the baseball game setting information 736 (step S8). Based on the baseball game results, the parameter varying section 220 updates the team parameters such as pennant ranking (step S10).

The game computing section 22 refers to the baseball game setting information 736 to determine whether or not the date is set as a TV broadcast date (step S12). If the date is set as a TV broadcast date (step S12; Yes), all the teams having a game are subjected to the process below (loop 1; step 14 to step 26).

That is, the TV rating calculating section 225 refers to the contents of the match-up result information 736e to calculate the TV rating according to the TV rating setting information 738 (step S16). The calculated TV rating is stored in the match-up result information 736e (step S18), and the TV rating average value 734b of the teams that have matched in the baseball game is updated (step S20).

The cash reward calculating section 226 calculates the cash reward according to the cash reward setting information 740 with reference to the TV rating stored in the match-up result information 736e (step S22), and adds the calculated cash reward to the fund 734c of the teams that have matched in the baseball game (step S24).

When loop 1 is executed for all the teams having a baseball game on the date, the negotiation contents setting process is then executed (step S30). The change-intended team determining section 221 selects a change-intended team which can change the configuration of its player characters, and the changes contents setting section 222 determines the contents of a change of the player characters of the selected team by a trade or foreign player acquirement. The information on the contents of the change of the player characters is registered in the negotiation contents information 744.

The players configuration changing section 223 then executes the player configuration changing process, in which the players configuration changing section 223 searches the contents of changes of the players (contents of "trade" and "foreign player acquirement negotiation") registered in the negotiation contents information 744, and, if any change is found with a predetermined number of days having elapsed from the negotiation starting date in the game world time, implements the contents of the found change sequentially to change the configuration of the player characters (step S32). The implemented "trade" or "foreign player acquirement negotiation" is deleted from the registration in the negotiation contents information 744.

When the changes of the configuration of the player characters are complete, the game computing section 22 determines whether or not the official game period has ended. If the official game period has not ended (step S34; No), the date counter is increased by a day (step S36) to return to step 2. If the official game period has ended (step S34; Yes), it is determined that the pennant race is over to end the game.

As in the conventional baseball games, it may be arranged that, if the game player's team is at the top of the pennant race when the game is over, the game player's team plays games in the championship race against the team that has won in another league.

[2. Flow of Negotiation Contents Setting Process]

Figure 11:
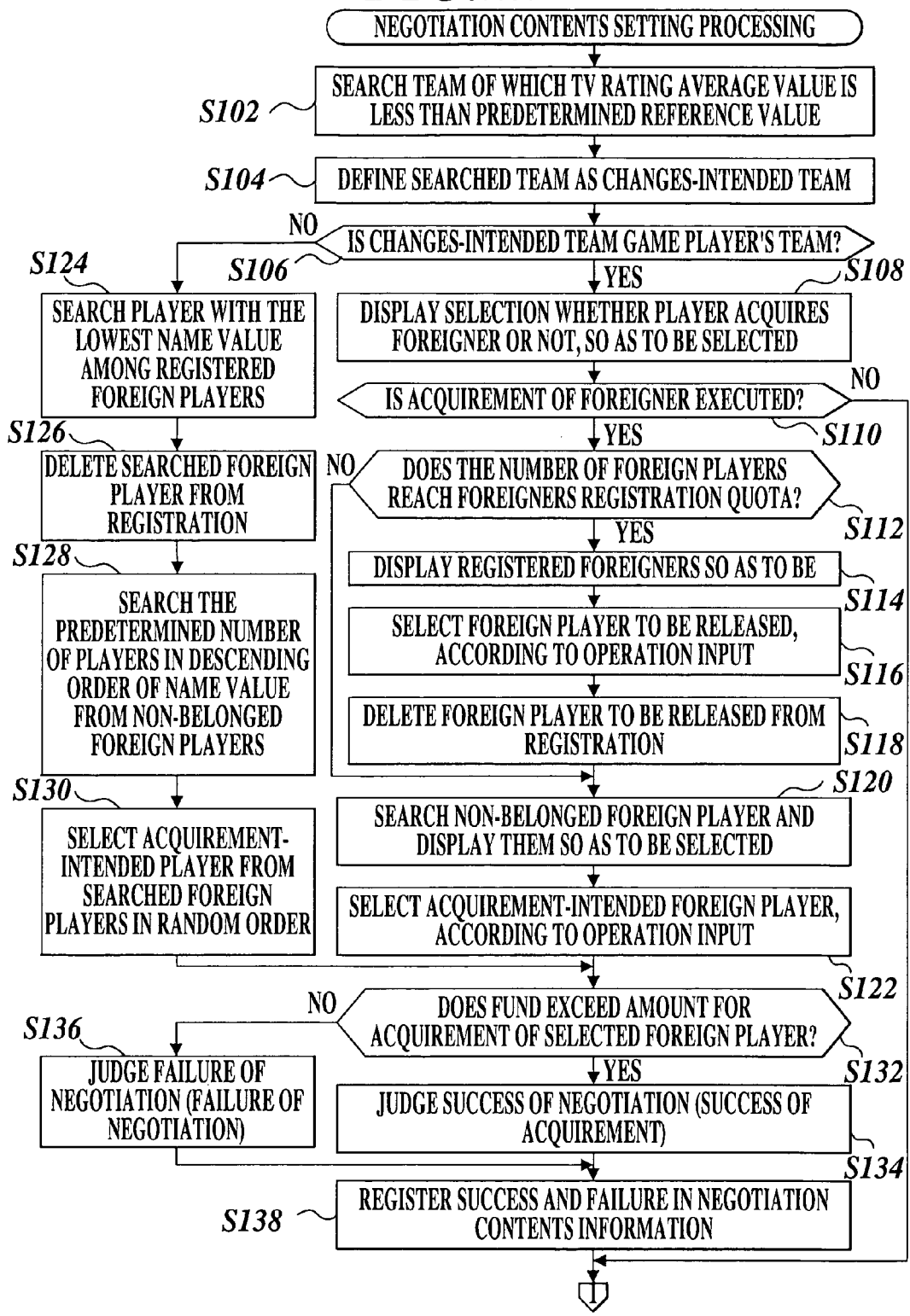
FIG. 11 is a flowchart for describing the negotiation contents setting process according to the first embodiment.
Figure 12:
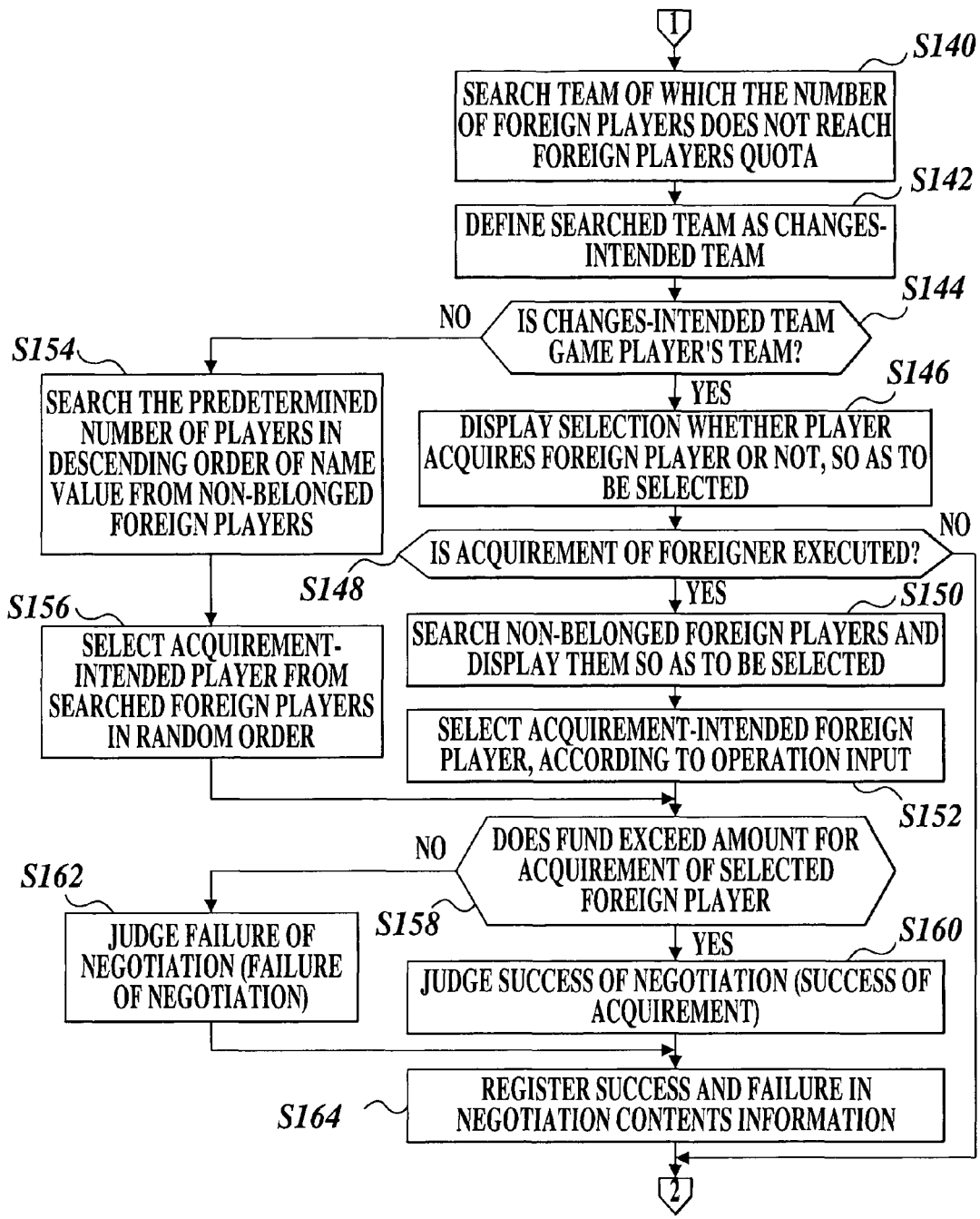
FIG. 12 is a flowchart for describing the negotiation contents setting process according to the first embodiment.
Figure 13:
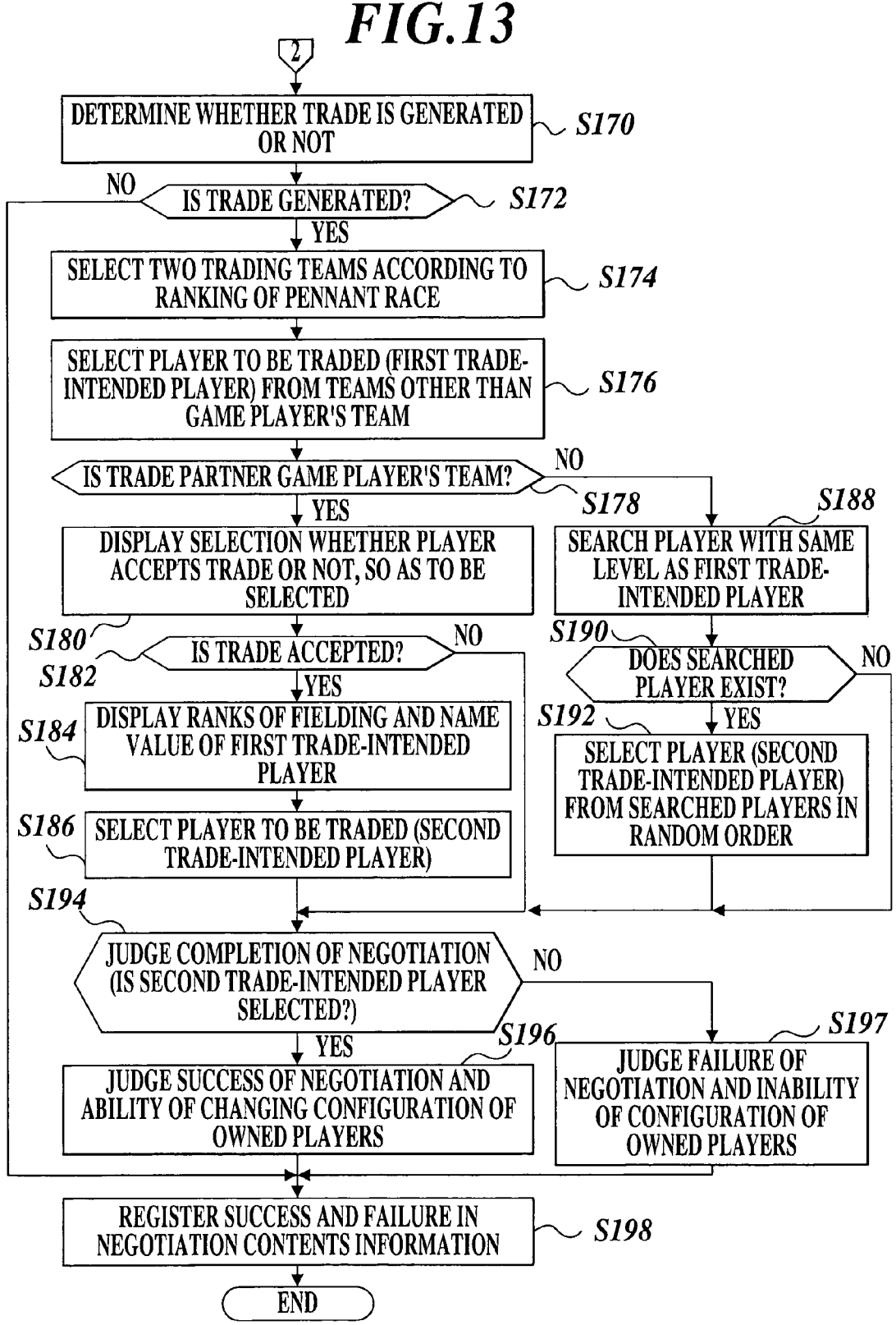
FIG. 13 is a flowchart for describing the negotiation contents setting process according to the first embodiment.

FIG. 11 to FIG. 13 are flowcharts for describing the negotiation contents setting process in this embodiment.

First, the change-intended team determining section 221 refers to the TV rating average values 734b of the teams, and searches for a team of which TV rating average value 734b is less than a predetermined reference value (3%, for example) (step S102). The change-intended team determining section 221 defines any found team as a change-intended team (step S104), judging that the team's popularity has become lower and that a change in the configuration of foreign players of the team would be required to enhance recovery of its popularity.

If the change-intended team is the game player's team (step S106; Yes), the changes contents setting section 222 allows displaying a picture in which the game player selects to or not to execute a change in the configuration of foreign players (foreign player acquisition) (step S108).

If the game player selects to execute a foreign player acquisition (step S110; Yes), it is determined whether or not the number of foreign players of the change-intended team has reached its foreigners registration quota (step S112).

If the foreigners registration quota is reached (step S112; Yes), the foreign players that are registered in the registered foreign player identification information 734g are displayed so as to be selectable (step S114). When the game player has made an input of selection, the changes contents setting section 222 determines the player character to be released according to the operation input (step S116), and the players configuration changing section 223 deletes the selected player character from the registration in the registered foreign player identification information 734g to store "0", which represents that the foreign player does not belong to any teams, to information relating to the belonged team 732b for the foreign player character (step S118).

The changes contents setting section 222 searches the player information 732 to allow displaying a list of non-belonged foreign players so as to be selectable (step S120).

When the game player has made an input of selection, the changes contents setting section 222 determines the acquirement-intended foreign player according to the operation input (step S122).

On the other hand, if the change-intended team is a team operated by the computer (step S106; No), the changes contents setting section 222 searches for a player character with the lowest name value 732c among the foreign players of (registered on) the team (step S124), and the players configuration changing section 223 deletes the player character from the registration (step S126).

The changes contents setting section 222 searches for a predetermined number of (10, for example) foreign players with highest name values 732c among non-belonged foreign players in the player information 732 (step S128), and selects a player character from the foreign players at random (step S130).

When the foreign player desired to be acquired is selected, a comparison is made between the fund 734c of the change-intended team and the acquired money 732d of the selected foreign player. If the fund 734c exceeds the acquired money 732d (step S132; Yes), the changes contents setting section 222 judges the success of the negotiation, that is, the success of the acquirement (step S134), and registers in the negotiation contents information 744 information on the negotiation contents to set the success or failure flag 744c to "1 (negotiation succeeded)" (step S138). If the fund 734c does not exceed the acquired money 732d (step S132; No), the changes contents setting section 222 judges the failure of the negotiation, that is, the failure of the acquirement (step S136), and registers in the negotiation contents information 744 information on the negotiation contents to set the success or failure flag 744c to "0 (negotiation failed)" (step S138).

Then, in FIG. 12, the change-intended team determining section 221 searches for a team of which number of foreign players 734d has not reached the foreign players quota "4" (step S140), and defines any found team as a change-intended team (step S142).

If the change-intended team is the game player's team (step S144; Yes), the changes contents setting section 222 allows displaying a screen in which the game player selects to or not to execute a change in the configuration of foreign players (foreign player acquisition) (step S146).

If the game player selects to execute a foreign player acquisition (step S148; Yes), the changes contents setting section 222 searches the player information 732 to allow displaying a list of non-belonged foreign players so as to be selectable (step S150). When the game player has made an input of selection, the changes contents setting section 222 determines the acquirement-intended foreign player according to the operation input (step S152).

If the change-intended team is a team operated by the computer (step S144; No), the changes contents setting section 222 searches for a predetermined number of (10, for example) foreign players with highest name values 732c among non-belonged foreign players in the player information 732 (step S154), and selects a player character from the foreign players at random (step S156).

When the foreign player desired to be acquired is selected, a comparison is made between the fund 734c of the change-intended team and the acquired money 732d of the selected foreign player. If the fund 734c exceeds the acquired money 732d (step S158; Yes), the changes contents setting section 222 judges the success of the negotiation, that is, the success of the acquirement (step S160), and registers in the negotiation contents information 744 information on the negotiation contents to set the success or failure flag 744c to "1 (negotiation succeeded)" (step S164). If the fund 734c does not exceed the acquired money 732d (step S158; No), the changes contents setting section 222 judges the failure of the negotiation, that is, the failure of the acquirement (step S162), and registers in the negotiation contents information 744 information on the negotiation contents to set the success or failure flag 744c to "0 (negotiation failed)" (step S164).

Then, in FIG. 13, the change-intended team determining section 221 determines whether or not a trade is generated at random with a predetermined probability (step S170). Specifically, a random number is generated so as to generate a trade with a probability of 5% in the first half of the competition period, and with a probability of 3% in the latter half of the competition period, for example.

If a trade is generated (step S172; Yes), the change-intended team determining section 221 determines two teams that make a trade according to the rankings in the pennant race (step S174). Specifically, a random number is generated for each team in sequence so as to determine whether or not the team is selected with a probability according to its ranking in the pennant race, until two teams are selected as trading teams, for example. The probability in the selection is set in advance to be lower (5%, for example) for a team with a higher ranking, and to be higher (35%, for example) for a team with a lower ranking.

When two teams are selected as the trading teams, the changes contents setting section 222 selects a player character to be released in the trade (first trade-intended player) from the team other than the game player's team (step S176). Specifically, the domestic players registered in the registered domestic player identification information 734f of the team are ranked according to their name values 732c, and a player character with a low name value and ranked in the lowest rank is selected at random, for example.

If the other team as a trading partner is the game player's team (step S178; Yes), the changes contents setting section 222 allows displaying a screen which informs the game player that a trade is offered and which allows the game player to select to or not to accept the trade (step S180).

If the game player makes an input to accept the trade (step S182; Yes), the changes contents setting section 222 allows displaying the fielding position and rank of the name value 732c of the player character already selected (first trade-intended player) (step S184). The list of the domestic players registered in the registered domestic player identification information 734f is displayed so as to be selectable, to allow the game player to select a player character to be traded (second trade-intended player) or to select to cancel the trade (step S186).

If the other team as a trading partner is not the game player's team (step S178; No), the changes contents setting section 221 searches for a player character generally at the same level as the player character already selected (first trade-intended player) (step S188). Specifically, a player character with the same fielding position as and generally in the same rank as the parameters of the player character already selected to be traded is searched for from the domestic players registered in the registered domestic player identification information 734f of the team, for example. If any player characters are found (step S190; Yes), a player character is selected at random from the found player characters (step S192).

The changes contents setting section 222 judges whether or not the negotiation goes through (step S194).

If the game player does not select a second trade-intended player, or if a second trade-intended player equivalent to the first trade-intended player is not selected from the team operated by the computer (step S194; No), the changes contents setting section 222 judges the failure of the negotiation, that is, the configuration of the player characters cannot be changed (step S196), and registers in the negotiation contents information 744 information on the negotiation contents to set the success or failure flag 744c to "0 (negotiation failed)" (step S198).

If a second trade-intended player is selected (step S194; Yes), the changes contents setting section 222 judges the success of the negotiation, that is, the configuration of the player characters can be changed (step S197), and registers in the negotiation contents information 744 information on the negotiation contents to set the success or failure flag 744c to "1 (negotiation succeeded)" (step S198).

[3. Flow of Player Configuration Changing Process]

FIG. 14 is a flowchart for describing the player configuration changing process in this embodiment.

As shown in the drawing, the players configuration changing section 223 refers to the negotiation contents information 744 (step S202), and compares the negotiation starting dates 744d of the registered foreign player acquirement negotiations or trades with the present date in the game world to search for a negotiation or trade with a predetermined number of days having elapsed from the negotiation starting date (step S204).

According to the contents of any found foreign player acquirement negotiation or trade, the configuration of player characters of the team in the change-intended team identification information 744a is changed.

Specifically, in the case of a foreign player acquirement negotiation (step S206; Yes), for example, if the success or failure flag 744c stored is "1," which indicates that the negotiation goes through (step S208; Yes), the team identification information of the negotiation partner is stored in the belonged team 732b of the foreign player in the change-intended player identification information 744b registered in the negotiation contents information 744 (step S210), and the player identification information of the foreign player is registered in the registered foreign player identification information 734g of the team in the change-intended team identification information 744a (step S212). The players configuration changing section 223 allows displaying on the game screen the success of the acquirement of the foreign player (step S214).

If the success or failure flag 744c stored is "0," which indicates that the negotiation does not go through (step S208; No), the players configuration changing section 223 allows displaying on the game screen the failure of the acquirement of the foreign player (step S215).

In the case of a trade of player characters between teams (step S206; No), for example, if the success or failure flag 744c stored is "1," which indicates that the negotiation goes through (step S216; Yes), the registered domestic player identification information 734f of each team and the belonged team 732b of the player information 732 are changed so that the two trade-intended teams exchange their trade-intended players (step S218). The players configuration changing section 223 allows displaying on the game screen the success of the trade (step S220).

If the success or failure flag 744c stored is "0," which indicates that the negotiation does not go through (step S216; No), the registered domestic player identification information 734f and the belonged team 732b of the player information 732 are not changed, and the players configuration changing section 223 allows displaying on the game screen the failure of the trade (step S222).

As a result of the processing above, events such as a trade and foreign player acquirement negotiation can be carried out in response to the state of the teams even during the pennant race, thereby enhancing the reality and appeal of the game.

Figure 15A:
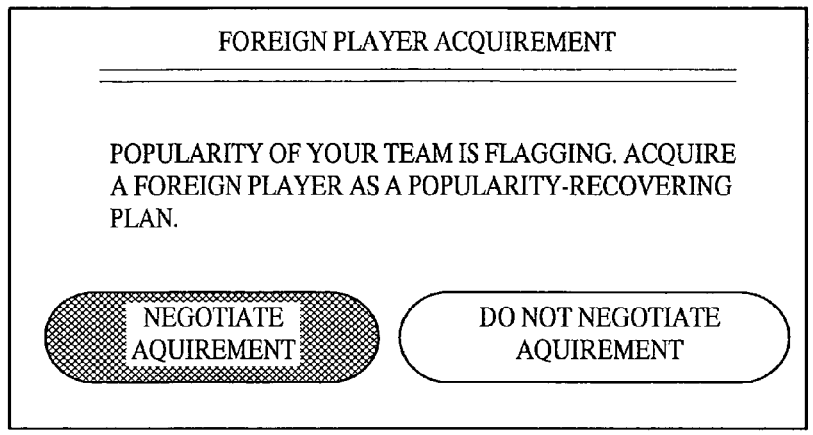
FIG. 15A to FIG. 15D shows examples of game screens in the first embodiment.

FIG. 15A to FIG. 15D show examples of game screens in this embodiment, showing examples of the screens concerning a foreign player acquirement negotiation. FIG. 15A is a game screen corresponding to step 108 in the negotiation contents setting process. The game screen displays a message "Popularity of your team is flagging. Acquire a foreign player as a popularity-recovering plan," for example, and also displays choices of whether or not to acquire a foreign player so as to be selectable.

Figure 15B:
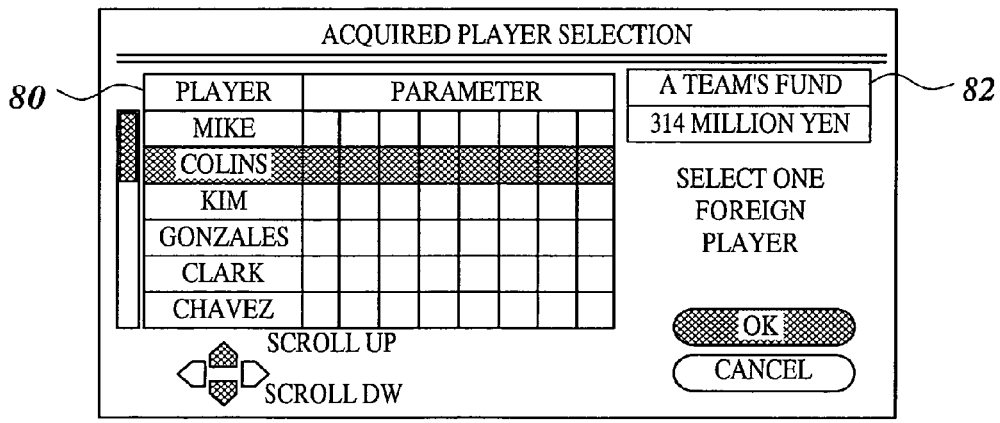

FIG. 15B is a game screen corresponding to step 120 in the negotiation contents setting process. The game screen displays an at-a-glance chart 80 showing non-belonged foreign players together with their parameters. Note that the at-a-glance chart 80 does not show the acquired money 732d in this embodiment. The game player takes into consideration the amount of team's fund available and the foreign players' parameters by reference to a fund displaying field 82 to select one player character, in the case of the drawing. Since the acquired money 732d of each player is not known at this time, the game player selects a foreign player so that the acquired money 732d of the selected foreign player will not exceed the fund of the game player's team, bearing in mind that the values of the foreign players' parameters are more or less proportional to their amount of acquired money, for example. In other words, price negotiation is executed.

Figure 15C:
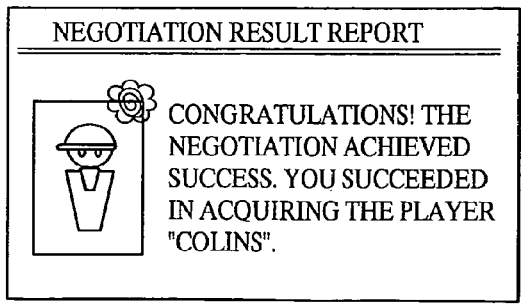
Figure 15D:
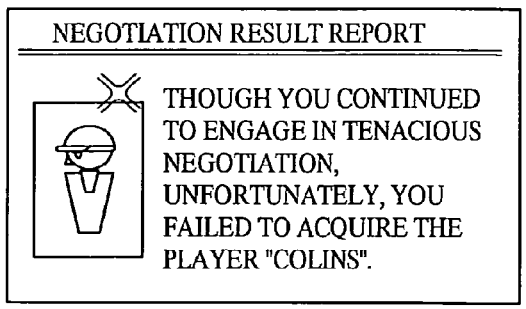

FIG. 15C and FIG. 15D are game screens corresponding to step 214 and step 215, respectively, in the player configuration changing process. The success or failure of a foreign player acquirement negotiation is informed on the game screen. If the acquired money 732d of the foreign player selected by the game player does not exceed the fund of the game player's team, the game screen of FIG. 15C is displayed, and if it does, the game screen of FIG. 15D is displayed.

[Hardware Configuration]

Descriptions will be next made of a hardware construction which could implement the functions of the home game unit 1200.

Figure 16:
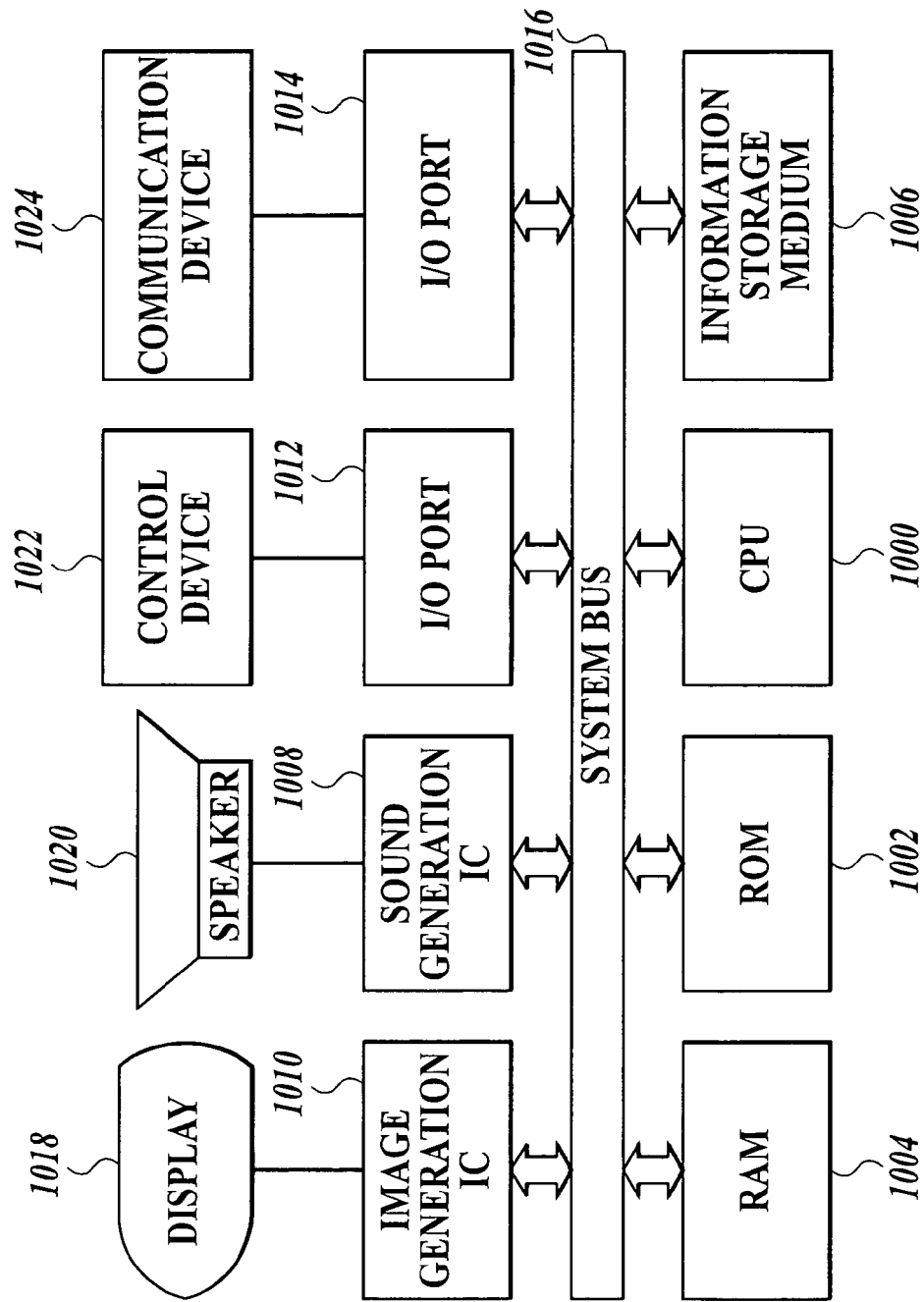
FIG. 16 shows an example of the hardware configuration for implementing the home game unit according to the first embodiment.

FIG. 16 is a diagram showing an example of the hardware construction according to the embodiment of the present invention. The home game unit 1200 has a CPU 1000, a ROM 1002, a RAM 1004, a data storage medium 1006, a sound generation IC 1008, an image generating IC 1010, and I/O ports 1012 and 1014. They are connected to each other via a system bus 1016 so as to input/output data.

The CPU 1000 corresponds to the processing section 40 in FIG. 3, and performs total control of the home game unit 1200 and various data processes, according to a program stored in the data storage medium 1006, a system program stored in the ROM 1002, the operation input signals inputted through the control device 1022 or the like.

The ROM 1002, the RAM 1004 and the data storage medium 1006 correspond to the storage section 70 in FIG. 3. The ROM 1002 corresponds to the IC memory implemented in the main unit 1210 in FIG. 1, and stores programs and data such as the system program or the like related to the control of the main unit 1210. The RAM 1004 is a storage section used as a work area of the CPU 1000. The RAM 1004 stores, for example, given contents in the ROM 1002 or the data storage medium 1006, results computed by the CPU 1000 and the like. The data storage medium 1006 corresponds to the CD-ROM 1212, the IC memory 1214 and the memory card 1216 in FIG. 1. The functions of the data storage medium 1006 could be implemented by an IC memory card, a hard disc unit detachable from the main unit, MO or the like. Furthermore, the data storage medium 1006 stores data stored in the ROM 1002, and loads the data to use, as needed.

The sound generation IC 1008 is an integrated circuit designed to generate game sounds such as sound effects and BGM based on the data stored in the data storage medium 1006 or the ROM 1002. The generated game sounds are output from a speaker 1020. The speaker 1020 corresponds to the sound output section 40 in FIG. 3 or the speaker 1222 in FIG. 1.

The image generating IC 1010 is an integrated circuit designed to generate pixel information for outputting images to a display 1018. The image generating IC 1010 corresponds to the image generating section 24 in FIG. 3. The display 1018 corresponds to the image displaying section 30 in FIG. 3 or the display 1220 in FIG. 1.

The I/O port 1012 connects to a control device 1022. The I/O port 1014 connects to a communication device 1024.

The control device 1022 corresponds to the operation input section 10 in FIG. 3, or the game controllers 1202 in FIG. 1. The control device 1022 is designed to permit a player to input various operation data The communication device 1024 is designed to input/output various information to be used in the game unit to/from an external device. It connects to another game device in order to transmit/receive information required for the game program. It also transmits/receives the game program information via a communication line. The communication device 1024 corresponds to the communication section 50 in FIG. 3 or the communication device 1218 in FIG. 1.

Software execution with the CPU 1000 or a general-purpose DSP may also be allowed for processes which could be executed by the sound generating IC 1008 or the image generating IC 1010.

The present invention applies not only to the home game unit 1200 shown in FIG. 1, but also to various devices including an arcade game device, a mobile game device, a general-purpose computer such as a personal computer, a large-sized attraction device in which many players can participate, or the like.

Figure 17:
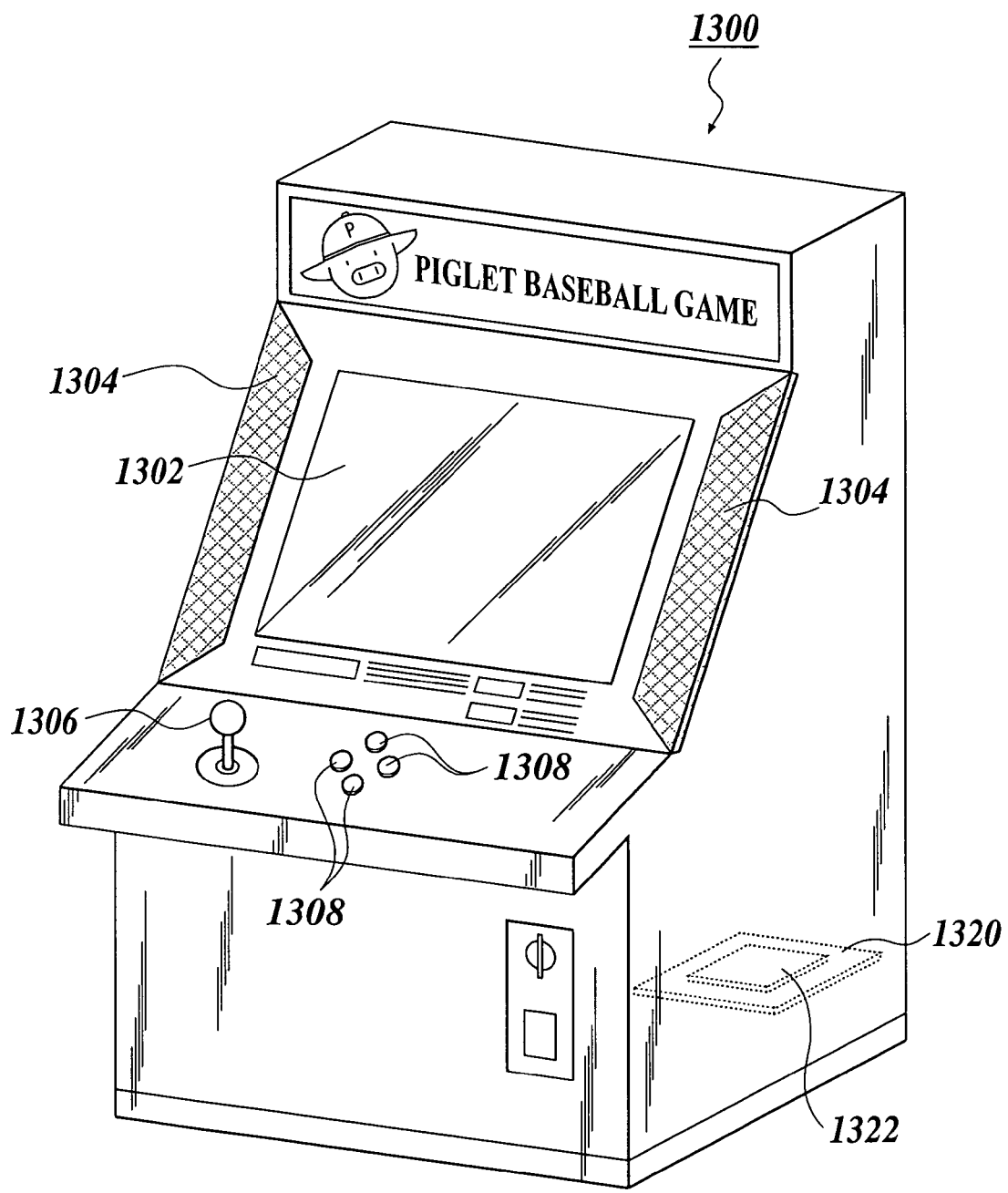
FIG. 17 shows an example of the exterior of an arcade game unit to which the present invention is applied.

FIG. 17 shows an example of the exterior of an arcade game unit 1300 to which the present invention is applied, for example. As shown in the drawing, an arcade game unit 1300 is provided with a display 1302 for displaying game pictures, a speaker 1304 for outputting sound effects and BGM in the game, a joystick 1306 for inputting vertical and horizontal operations, push buttons 1308, and a control unit 1320 for integrally controlling the arcade game unit 1300 by computer processing to execute a given game.

The control unit 1320 is equipped with a processing unit such as a CPU, and a ROM 1322 in which game programs and data are stored that are required to control the arcade game unit 1300 and to execute the game. The CPU mounted on the control unit 1320 reads from the ROM 1322 as appropriate and computes the programs and data to execute a variety of processes.

The game player operates the joystick 1306 and push buttons 1308 while watching the game pictures displayed on the display 1302 to enjoy playing the game.

It should be understood that the application of the present invention is not limited to games to be executed on a stand-alone device, but the present invention may be applied to those called network games. Examples of the system configuration designed to implement a network game are as follows: (1) configuration having a home PC or home game system as a game terminal to be connected to a server via a wired/wireless communication line such as the Internet or a dedicated line network; (2) configuration connecting multiple game terminals to each other via a communication line without a server; (3) configuration connecting multiple game terminals via a communication line, one of which functions as a server; and (4) configuration physically linking multiple game terminals with each other to serve as a single system (e.g. arcade game system).

Second Embodiment

Description will be made of a second embodiment to which the present invention is applied with reference to FIG. 18 to FIG. 22. This embodiment is characterized by a virtual manager provided for each team, according to the parameters of which a player character is selected in a trade or foreign player acquirement negotiation. Note that this embodiment can be implemented basically by the same constituent elements as those in the first embodiment, to which the same reference numerals and symbols are affixed and of which description will be omitted as appropriate.

[Description of Function Block]

Figure 18:
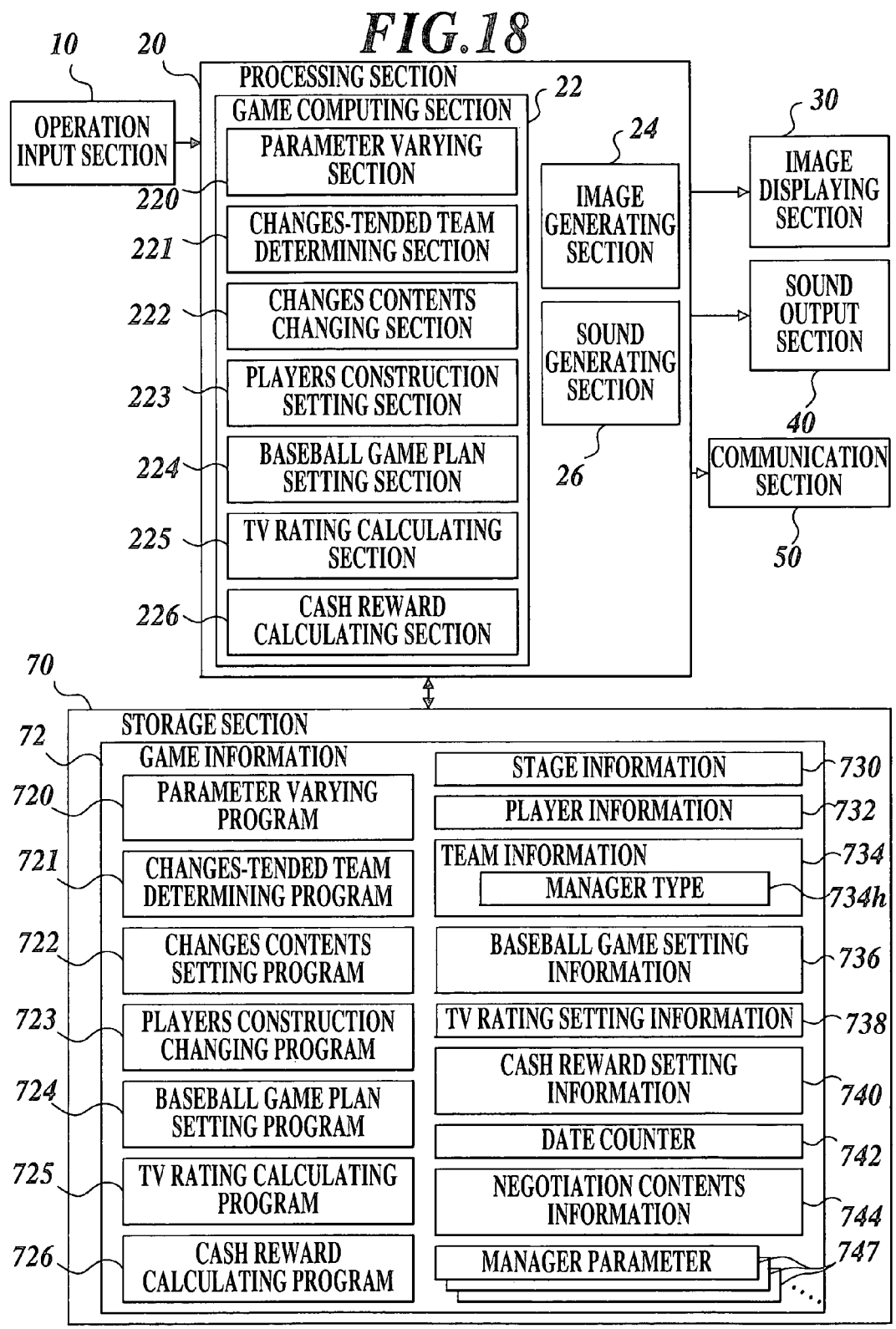
FIG. 18 is a functional block diagram showing an example of the functional configuration according to the second embodiment.

FIG. 18 is a functional block diagram showing an example of the functional configuration of this embodiment. As shown in the drawing, the team information 734 includes manager type 734h, and the game information 72 includes manager parameters 747 for each manager type.

Figure 19:
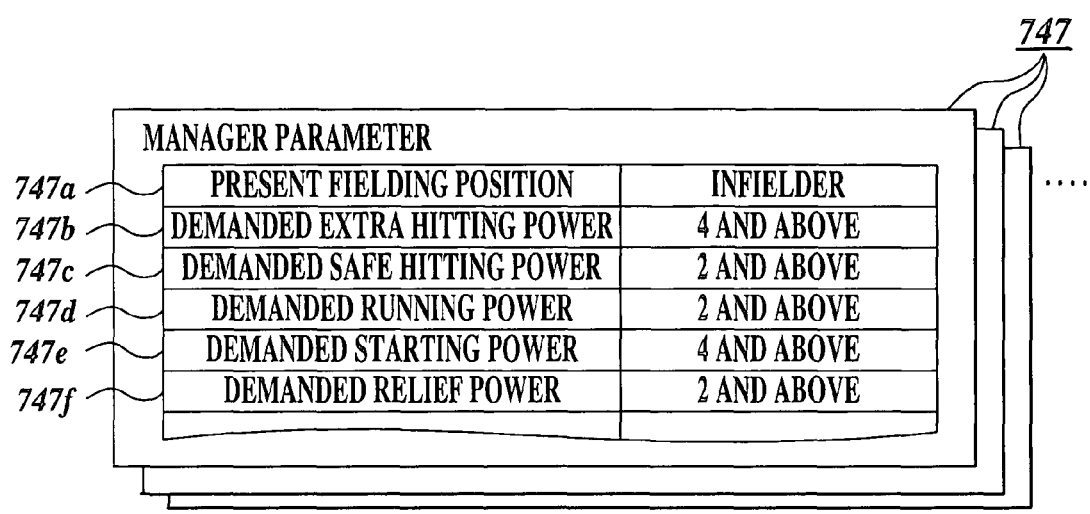
FIG. 19 shows an example of the manager parameters.

FIG. 19 shows an example of the manager parameters in this embodiment. The manager parameters 747 correspond to the team arrangement and team management policy of the virtual manager. In this embodiment, the manager parameters 747 include fielding position when active 747a, demanded extra hitting power 747b, demanded safe hitting power 747c, demanded running power 747d, demanded starting power 747e, and demanded relief power 747f, for example. The manager_parameters 747 may also include a predetermined thinking routine concerning strategies of, for example, utilization of players, bunting, and hit-and-run play.

The fielding position when active 747a is the fielding position of the virtual manager when active, and arranges that a player character of the same fielding position is selected with a higher probability in the negotiation setting process.

The demanded extra hitting power 747b, demanded safe hitting power 747c, and demanded running power 747d correspond to the tendencies in quality required of fielders, that is, a player character satisfying these requirements is selected with priority. For example, if the demanded extra hitting power 747b is "4 and above" and the demanded safe hitting power 747c is "1 and above" in their comparison, the manager has a tendency to think much of long hits rather than the batting average. If the parameters have the opposite relation, the manager has a tendency to gain points step by step with a high batting average, rather than to gain points by long hits.

The demanded starting power 747e and demanded relief power 747f show the tendencies in quality required of pitchers, that is, a player character satisfying these requirements is selected with priority. For example, if the demanded starting power 747e is large and the demanded relief power 747f is small in their comparison, the manager has a tendency to think much of starting pitchers, and if opposite, the manager has a tendency to think much of relief pitchers.

The game player's team is not provided with a virtual manager, since the game player itself serves as the manager in command.

[Description of Process Flow]

Figure 20:
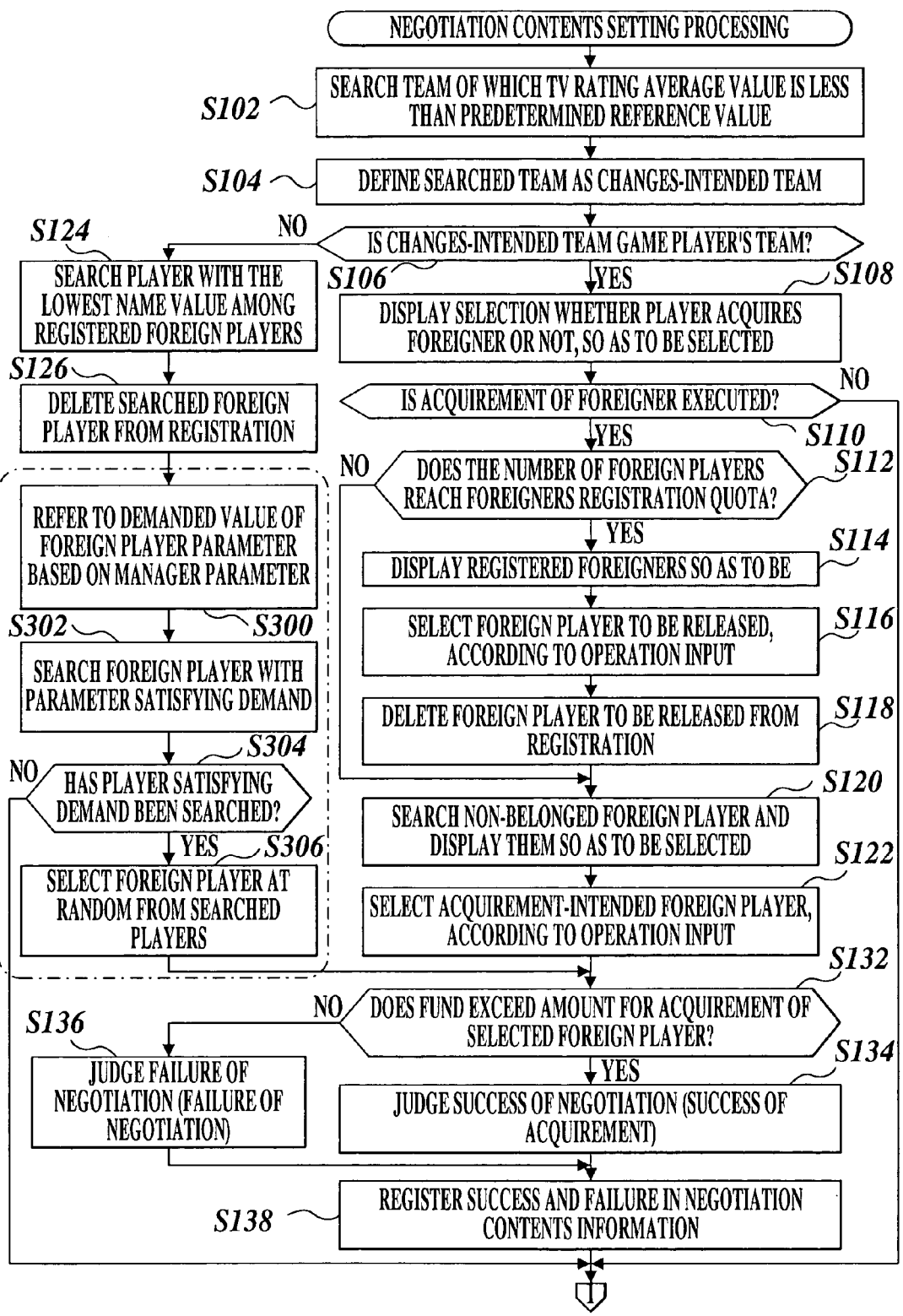
FIG. 20 is a flowchart for describing the negotiation contents setting process according to the second embodiment.
Figure 21:
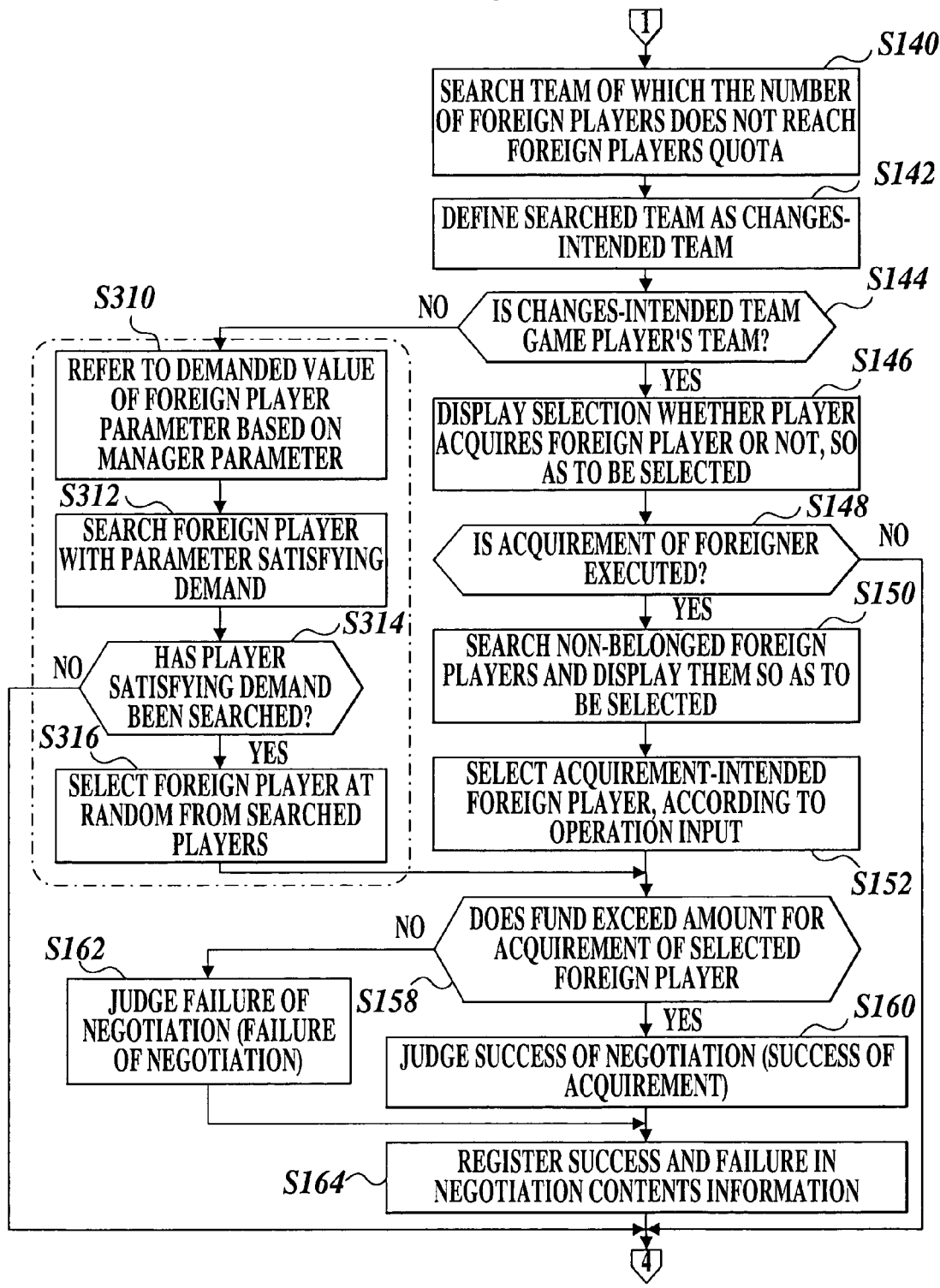
FIG. 21 is a flowchart for describing the negotiation contents setting process according to the second embodiment.
Figure 22:
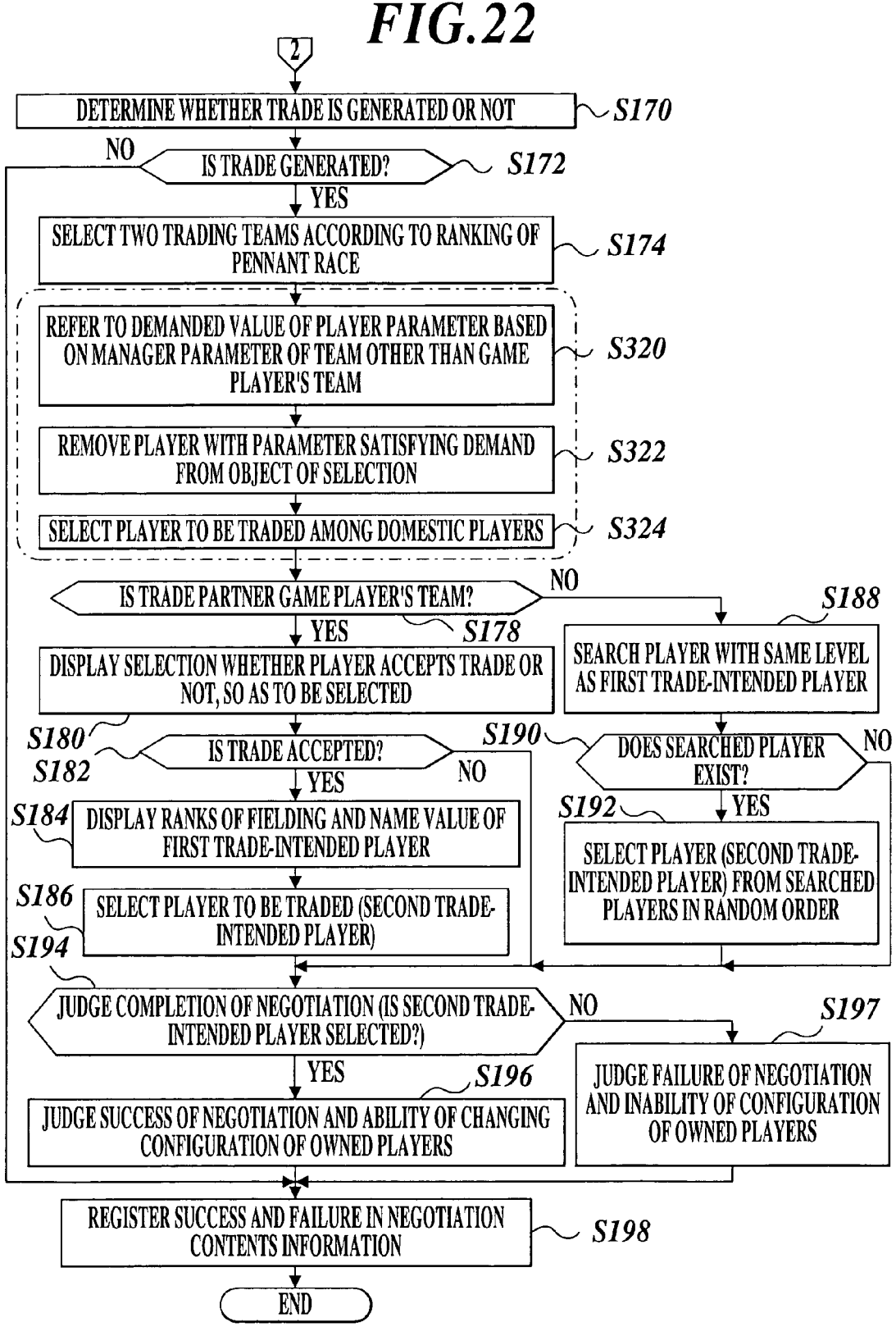
FIG. 22 is a flowchart for describing the negotiation contents setting process according to the second embodiment.

FIG. 20 to FIG. 22 are flowcharts for describing the changes contents setting processing in this embodiment. Note that steps different from those in the first embodiment are affixed with numerals in the 300s.

As shown in FIG. 20, in the changes contents setting processing in this embodiment, the players configuration changing section 223 refers to the demanded parameter values for foreign players based on the manager parameters 747 of the team in the selection of a foreign player (step S300). Foreign players with parameters satisfying such demands are searched for (step S302), and, if any player characters satisfying the demands are found (step S304; Yes), a foreign player is selected at random from the found player characters (step S306). On the other hand, if any player character with parameters satisfying the demands is not found (step S304; No), the negotiation is cancelled.

In FIG. 21, likewise, the players configuration changing section 223 refers to the demanded parameter values for foreign players based on the manager parameters 747 of the team in the selection of a foreign player (step S310). Foreign players with parameters satisfying such demands are searched for (step S312), and, if any player characters satisfying the demands are found (step S314; Yes), a foreign player is selected at random from the found player characters (step S316). On the other hand, if any player character with parameters satisfying the demands is not found (step S314; No), the negotiation is cancelled.

In FIG. 22, in the selection of trade-intended player characters, the demanded parameter values for domestic players are referred to based on the manager parameters 747 of the team other than the game player's team (step S320). The player information 732 of the player characters registered in the registered domestic player identification information 734f of the team is referred to, the player characters with parameters satisfying such demands are removed from the objects of the selection (step S322), and a player character is selected from the other domestic players (step S324).

Likewise, in the selection of a second trade-intended player from a team operated by the computer, the demanded parameter values for domestic players are referred to based on the manager parameters 747 (step S326) before step 176, the player information 732 of the player characters registered in the registered domestic player identification information 734f of the team is referred to, and the player characters with parameters satisfying such demands are removed from the objects of the selection (step S328).

In this way, according to the arrangement that a virtual manager is provided to reflect its characteristic in the configuration change of player characters of the team, each team controlled by the computer can be gradually characterized over trades and foreign player acquirement negotiations. Thus, the game player can play games against teams with more distinct characteristics as the game proceeds, thereby increasing the enjoyment in the game play.

Third Embodiment

Description will be made of a third embodiment to which the present invention is applied with reference to FIG. 23. This embodiment is characterized by a function of automatically generating non-belonged, unregistered foreign players. Note that this embodiment can be implemented basically by the same constituent elements as those in the first and the second embodiment, to which the same reference numerals and symbols are affixed and of which description will be omitted as appropriate.

[Description of Function Block]

Figure 23:
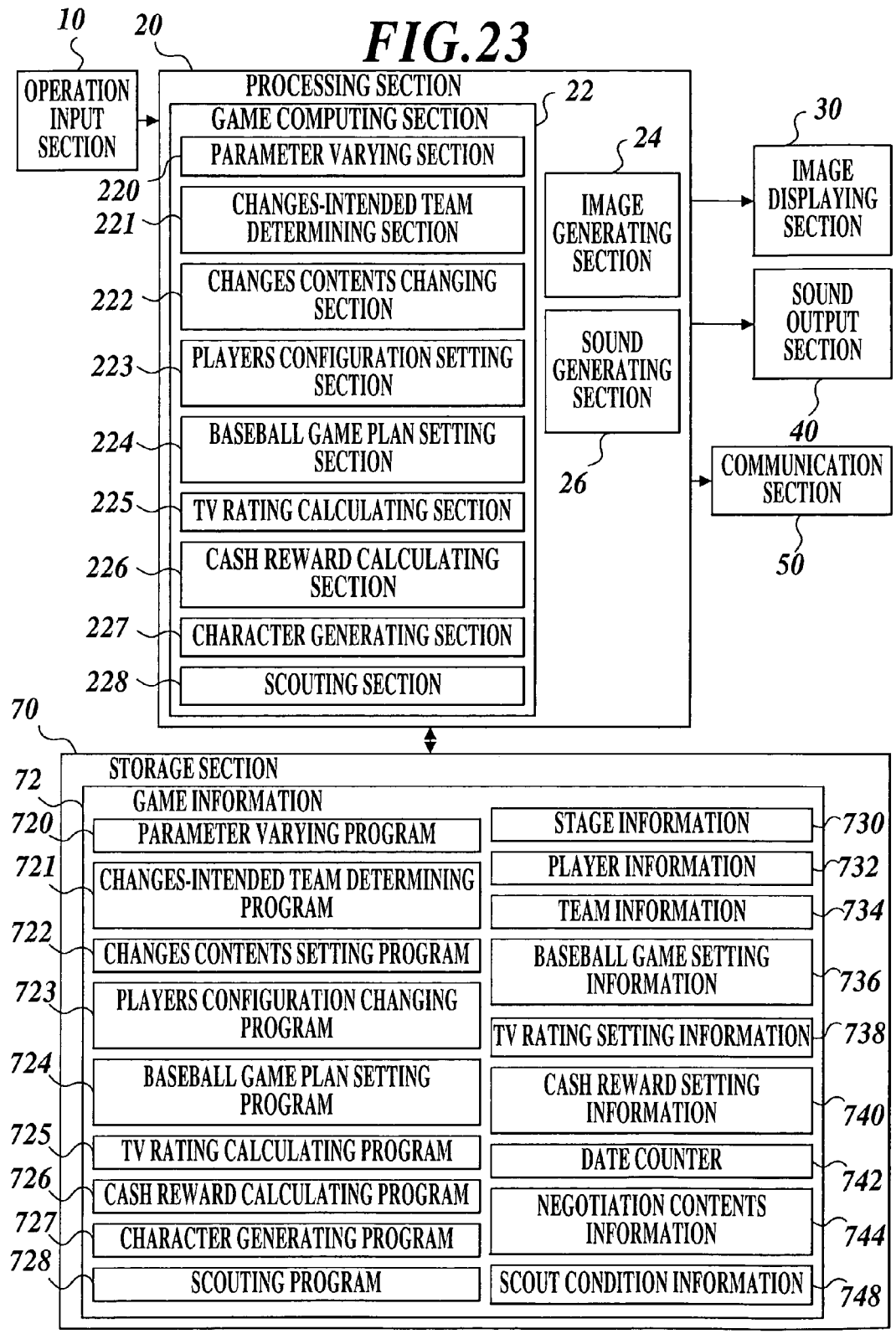
FIG. 23 is a functional block diagram showing an example of the functional configuration according to the third embodiment.

FIG. 23 is a functional block diagram showing an example of the functional configuration of this embodiment. As shown in the drawing, the game computing section 22 in this embodiment includes a character generating section 227 and a scouting section 228. The game information 72 includes a character generating program 727 for permitting the processing section 20 to function as the character generating section 227, and a scouting program 728 for permitting it to function as the scouting section 228.

The character generating section 227 generates a non-belonged, unregistered foreign player to be added to the player information 732. More specifically, a player list may be provided in advance that includes player identification information 732a and player's names related thereto, and, each time a new foreign player is to be generated, one may be selected at random from the player list and the parameters of the selected player identification information 732a may be set at random to be added to the player information 732. In this embodiment, the character generating section 227 generates 1 to 3 new characters for every predetermined period of time (2 months, for example) in the game world. Alternatively, the character generating section 227 may generate characters a predetermined number of times with random timing during the official game period.

In this way, the character generating section 227 creates new foreign players other than the prearranged foreign players, thereby allowing the acquisition of a completely new foreign player as if the player was scouted from a foreign baseball league. In this embodiment, additionally, since the parameters of a newly generated foreign player are set at random, there may happen to appear an all-round player character or a player character with a particular specialty, thereby adding unpredictability to the game.

When the game player sets in advance the conditions of a foreign player desired to be acquired, the scouting section 228 regularly searches the player information 732 to judge whether or not any non-belonged foreign player satisfying such conditions exists. If a foreign player satisfying such conditions is found, the game player is informed on the game screen that a desired foreign player exists. That is, the game player can use a virtual scouter by the scouting section 228, thereby the operability of the game can be increased. This is especially effective if the character generating section 227 generates foreign players with random timing.

The conditions set in advance by the game player, which are used by the scouting section 228 as the search conditions, are temporarily stored in the game information 72 as scout condition information 748. In the same manner as the manager parameters 747 in the second embodiment, for example, the contents of the scout condition information 748 may include the fielding position when active 747a, demanded extra hitting power 747b, demanded safe hitting power 747c, demanded running power 747d, demanded starting power 747e, and demanded relief power 747f.

[Description of Modification]

Note that the present invention is not limited to the first to third preferable embodiments described above, and that its constituent elements may be added, omitted, or modified as appropriate within the scope of the invention.

Although a configuration change of player characters of a team can be made during the official game period in the embodiments above, it may be arranged that it can be made before or after the official game period (competition period), that is, in the off-season, for example. During the off-season, the changes contents setting processing and player configuration changing process are executed when a predetermined operation is made, for example. At this time, the parameter values at the end of the last official game period are used as the team parameters.

Although the player configuration changing process is arranged so that a trade or foreign player acquirement negotiation with a predetermined number of days having elapsed from the negotiation starting date is brought into execution (reflected in the game), such conditions may be omitted.

Although a trade is described as an exchange of a player character for another player character, the so-called "money trade," which is an exchange of a player character for money, may also be possible.

The acquired money 732d is set in advance also for domestic players, for example. In step 174, a player character desired to be acquired is selected as a first trade-intended player from the domestic players of the team as a trading partner. If the releasing team is the game player's team, the game player selects to or not to accept the trade, and if the releasing team is a computer team, the decision is made at random.

When the trade is accepted, a comparison is made between the fund 734c of the team desiring the acquirement and the acquired money 732d of the selected player character. If the fund 734c exceeds the acquired money 732d, the changes contents setting section 222 judges the success of the negotiation, that is, the success of the acquirement, and registers in the negotiation contents information 744 the identification information of the player character and information on the negotiation contents to set the success or failure flag 744c to "1 (negotiation succeeded)."

To the contrary, if the fund 734c does not exceed the acquired money 732d, the changes contents setting section 222 judges the failure of the negotiation, that is, the failure of the acquirement, and registers in the negotiation contents information 744 information on the negotiation contents to set the success or failure flag 744c to "0 (negotiation failed)" (see step 158 to step 164). When the negotiation goes through, the players configuration changing section 223 transfers the change-intended player from the releasing team to the acquiring team, and transfers the acquired money from the fund 734c of the acquiring team to that of the releasing team.

The entire disclosure of Japanese Patent Application No. Tokugan 2003-067374 filed on Mar. 12, 2003 including specification, claims, drawings and summary are incorporated herein by reference in its entirety.

What is claimed is:

1. A game performing method for executing a sports game on a game machine having a controller and a display, in which teams formed of a plurality of characters play against each other while alternating an opponent team during a virtual competition period for a ranking of the teams during the competition period, the teams consisting of a team operated by a player and a team automatically controlled by computer control, the method comprising:

changing an ability parameter value which is set to each of the characters according to a proceeding of the game;

selecting automatically by computer control a plurality of trade-intended teams which trade characters, out of the plurality of teams, the trade-intended teams which are computer controlled teams;

automatically selecting by computer control a trade-intended character among the characters belonging to the trade-intended team and trading the trade-intended character between the trade-intended teams by performing a negotiation between the computer controlled trade-intended teams based on each trade-intended team's requirement of a category of an ability parameter of the character, the trade-intended character does not satisfy a demanded ability value condition of the trade-intended team, the demanded ability value condition being a condition demanded for each team's requirement of the category of the ability parameter of the character among a plurality of ability parameters; and outputting the game on the display.

2. The game performing method as claimed in claim 1, wherein the demanded ability value condition is a condition determined as a policy of a manager of the team.

3. The game performing method as claimed in claim 1, wherein selecting the trade-intended team includes selecting the trade-intended team based on the ranking.

4. The game performing method as claimed in claim 1, further comprising:

selecting an affiliation candidate team for a new character to join, among the plurality of teams;

selecting as a newly joining character, a non-belonged character with the ability parameter value satisfying the demanded ability value condition of the affiliation candidate team, among a plurality of non-belonged characters belonging to none of the teams; and making the newly joining character join the affiliation candidate team.

5. The game performing method as claimed in claim 1, further comprising:

changing a frequency of making the trade, according to a proceeding of the game.

6. A non-transitory computer-readable storage medium storing a computer program, the computer program causing the operating apparatus to execute the method as claimed in claim 1.

7. A game machine for executing a sports game in which teams formed of a plurality of characters play against each other while alternating an opponent team during a virtual competition period for a ranking of the teams during the competition period, the teams consisting of a team operated by a player and a team automatically controlled by computer control, the machine comprising:

an ability value changing section for changing an ability parameter value which is set to each of the characters according to a proceeding of the game;

a team selecting section for selecting automatically by computer control a plurality of trade-intended teams which trade characters, out of the plurality of teams, the trade-intended teams which are computer controlled teams; and a trade processing section for automatically selecting by computer control a trade-intended character among the characters belonging to the trade-intended team and trading the trade-intended character between the trade-intended teams by performing, a negotiation between the computer controlled trade-intended teams based on each trade-intended team's requirement of a category of an ability parameter of the character, the trade-intended character does not satisfy a demanded ability value condition of the trade-intended team, the demanded ability value condition being a condition demanded for each team's requirement of the category of the ability parameter of the character among a plurality of ability parameters.

* * * * *